(12) United States Patent
Powar et al.

(10) Patent No.: US 9,159,338 B2
(45) Date of Patent: Oct. 13, 2015

(54) SYSTEMS AND METHODS OF RENDERING A TEXTUAL ANIMATION

(75) Inventors: Rahul Powar, London (GB); Avery Li-Chun Wang, Palo Alto, CA (US)

(73) Assignee: Shazam Entertainment Ltd., London (GB)

( * ) Notice: Subject to any disclaimer, the term of this patent is extended or adjusted under 35 U.S.C. 154(b) by 1227 days.

(21) Appl. No.: 12/960,165

(22) Filed: Dec. 3, 2010

(65) Prior Publication Data

US 2011/0273455 A1 Nov. 10, 2011

Related U.S. Application Data

(60) Provisional application No. 61/331,015, filed on May 4, 2010.

(51) Int. Cl.
| | |
|---|---|
| *G10L 21/06* | (2013.01) |
| *G10L 21/18* | (2013.01) |
| *G06F 17/30* | (2006.01) |
| *G10H 1/36* | (2006.01) |
| *G11B 27/10* | (2006.01) |
| *G11B 27/11* | (2006.01) |

(Continued)

(52) U.S. Cl.
CPC .......... *G10L 21/06* (2013.01); *G06F 17/30769* (2013.01); *G10H 1/368* (2013.01); *G10L 21/18* (2013.01); *G11B 27/10* (2013.01); *G11B 27/11* (2013.01); *G11B 27/28* (2013.01); *G10H 2220/011* (2013.01); *G10H 2240/251* (2013.01); *G10L 15/26* (2013.01); *G10L 21/10* (2013.01)

(58) Field of Classification Search
USPC .................. 704/231, 235–240, 270, 272, 276, 704/E15.001–E15.05, E11.001–E11.007
See application file for complete search history.

(56) References Cited

U.S. PATENT DOCUMENTS

| | | |
|---|---|---|
| 4,450,531 A | 5/1984 | Kenyon et al. |
| 4,843,562 A | 6/1989 | Kenyon et al. |

(Continued)

FOREIGN PATENT DOCUMENTS

WO WO 2008/096099 8/2008

OTHER PUBLICATIONS

International Search Report and Written Opinion prepared by the European Patent Office in PCT/US2011/062887, mailed Feb. 21, 2012.

(Continued)

*Primary Examiner* — Pierre-Louis Desir
*Assistant Examiner* — David Kovacek
(74) *Attorney, Agent, or Firm* — McDonnell Boehnen Hulbert & Berghoff LLP

(57) ABSTRACT

Systems and methods of rendering a textual animation are provided. The methods include receiving an audio sample of an audio signal that is being rendered by a media rendering source. The methods also include receiving one or more descriptors for the audio signal based on at least one of a semantic vector, an audio vector, and an emotion vector. Based on the one or more descriptors, a client device may render the textual transcriptions of vocal elements of the audio signal in an animated manner. The client device may further render the textual transcriptions of the vocal elements of the audio signal to be substantially in synchrony to the audio signal being rendered by the media rendering source. In addition, the client device may further receive an identification of a song corresponding to the audio sample, and may render lyrics of the song in an animated manner.

32 Claims, 9 Drawing Sheets

(51) Int. Cl.
*G11B 27/28* (2006.01)
*G10L 15/26* (2006.01)
*G10L 21/10* (2013.01)

(56) References Cited

U.S. PATENT DOCUMENTS

| | | | |
|---|---|---|---|
| 5,134,719 A | 7/1992 | Mankovitz | |
| 5,333,275 A | 7/1994 | Wheatley et al. | |
| 5,465,240 A | 11/1995 | Mankovitz | |
| 5,630,017 A * | 5/1997 | Gasper et al. | 704/276 |
| 5,649,060 A | 7/1997 | Ellozy et al. | |
| 5,674,743 A | 10/1997 | Ulmer | |
| 5,734,794 A * | 3/1998 | White | 704/275 |
| 5,740,230 A | 4/1998 | Vaudreuil | |
| 5,918,223 A | 6/1999 | Blum et al. | |
| 5,952,597 A | 9/1999 | Weinstock et al. | |
| 6,067,095 A * | 5/2000 | Danieli | 345/473 |
| 6,107,559 A | 8/2000 | Weinstock et al. | |
| 6,154,757 A * | 11/2000 | Krause et al. | 715/205 |
| 6,166,314 A | 12/2000 | Weinstock et al. | |
| 6,324,511 B1 * | 11/2001 | Kiraly et al. | 704/260 |
| 6,423,672 B1 * | 7/2002 | Massaro et al. | |
| 6,476,306 B2 | 11/2002 | Huopaniemi et al. | |
| 6,490,553 B2 * | 12/2002 | Van Thong et al. | 704/211 |
| 6,539,354 B1 * | 3/2003 | Sutton et al. | 704/260 |
| 6,792,007 B1 | 9/2004 | Hamada et al. | |
| 6,911,592 B1 | 6/2005 | Futamase | |
| 6,966,065 B1 | 11/2005 | Kitazato et al. | |
| 6,990,453 B2 | 1/2006 | Wang et al. | |
| 7,058,889 B2 * | 6/2006 | Trovato et al. | 715/716 |
| 7,164,076 B2 * | 1/2007 | McHale et al. | 84/616 |
| 7,168,953 B1 * | 1/2007 | Poggio et al. | 434/185 |
| 7,190,971 B1 | 3/2007 | Kawamoto | |
| 7,194,752 B1 | 3/2007 | Kenyon et al. | |
| 7,277,766 B1 | 10/2007 | Khan et al. | |
| 7,444,353 B1 | 10/2008 | Chen et al. | |
| 7,627,477 B2 | 12/2009 | Wang | |
| 8,015,009 B2 * | 9/2011 | Harband et al. | |
| 8,686,271 B2 * | 4/2014 | Wang et al. | 84/600 |
| 2002/0010715 A1 * | 1/2002 | Chinn et al. | 707/514 |
| 2002/0072982 A1 | 6/2002 | Barton et al. | |
| 2002/0083060 A1 | 6/2002 | Wang et al. | |
| 2002/0163533 A1 * | 11/2002 | Trovato et al. | 345/728 |
| 2004/0230572 A1 | 11/2004 | Omoigui | |
| 2004/0266337 A1 | 12/2004 | Radcliffe et al. | |
| 2005/0055639 A1 * | 3/2005 | Fogg | 715/535 |
| 2005/0075885 A1 * | 4/2005 | Danieli | 704/276 |
| 2005/0267817 A1 | 12/2005 | Barton et al. | |
| 2006/0009979 A1 * | 1/2006 | McHale et al. | 704/270 |
| 2006/0112812 A1 | 6/2006 | Venkataraman et al. | |
| 2006/0149558 A1 * | 7/2006 | Kahn et al. | 704/278 |
| 2007/0011012 A1 * | 1/2007 | Yurick et al. | 704/277 |
| 2007/0022867 A1 | 2/2007 | Yamashita | |
| 2007/0143777 A1 | 6/2007 | Wang | |
| 2007/0166683 A1 | 7/2007 | Chang et al. | |
| 2008/0097754 A1 | 4/2008 | Goto et al. | |
| 2008/0177623 A1 * | 7/2008 | Fritsch et al. | 705/11 |
| 2008/0196575 A1 | 8/2008 | Good | |
| 2008/0263360 A1 | 10/2008 | Haitsma et al. | |
| 2009/0056526 A1 * | 3/2009 | Yamashita et al. | 84/611 |
| 2009/0083281 A1 | 3/2009 | Sarig et al. | |
| 2009/0135177 A1 * | 5/2009 | Strietzel et al. | 345/419 |
| 2009/0307207 A1 | 12/2009 | Murray | |
| 2010/0145708 A1 | 6/2010 | Master et al. | |
| 2010/0262909 A1 * | 10/2010 | Hsieh | 715/716 |
| 2010/0305945 A1 * | 12/2010 | Krishnaswamy et al. | 704/235 |
| 2011/0163939 A1 * | 7/2011 | Tam et al. | 345/2.3 |
| 2011/0273455 A1 * | 11/2011 | Powar et al. | 345/473 |

OTHER PUBLICATIONS

Kim et al., "Music Emotion Recognition: A state of the Art Review", 11th International Society for Music Information Retrieval Conference (2010).

Vy et al., "EnACT: A software tool for creating animated text captions", ICCHP 2008, LNCS 5105, pp. 609-616 (2008).

Geleijnse et al., "Enriching Music with Synchronized Lyrics, Images, and Colored Lights", Ambi-Sys'08, Feb. 11-14, 2008, Quebec, Canada.

Shi-Kuo Chang, Zen Chen, Suh-Yin Lee / Oostveen, J., et al., "Recent Advances in Visual Information Systems", 5th International Conference, Visual 2002, "Feature Extraction and a Database Strategy for Video Fingerprinting", Lecture Notes in Computer Science, 2314, (Mar. 11, 2002), 117-128.

Macrae et al., "MuViSync: Realtime Music Video Alignment", available from http://www.xavieranguera.com/papers/icme2010.pdf, at least on Dec. 2, 2010.

Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.

Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.

Young et al., The HTK Book (for HTK Version 3.4), first published Dec. 1995.

Fujihara et al., "Three Techniques for Improving Automatic Synchronization Between Music and Lyrics: Fricative Detection, Filler Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

Examination Report from the EPO mailed Jun. 18, 2014.

* cited by examiner

SYSTEMS AND METHODS OF RENDERING A TEXTUAL ANIMATION

CROSS-REFERENCE TO RELATED APPLICATION

The present application claims priority to U.S. Patent Application Ser. No. 61/331,015 filed on May 4, 2010, the entire contents of which are herein incorporated by reference.

FIELD

The present disclosure relates to media information retrieval and animation of content of media. For example, the present disclosure relates to music information retrieval and textual transcription or lyric animation and/or synchronization.

BACKGROUND

Display systems in music technology enable visualization of recorded and performed music. Signal processors, music instrument digital interfaces (MIDI), sequencers, and music workstations can be used to create a desired visualization or provide visual effects of musical information. For example, systems may convert audio signals into rhythmic light effects. The systems may use signal processing to separate the audio signals into frequency bands and control light channels according to an average level of each frequency band using dimmers or other light controls. A number of light channels may be used including red, blue, and yellow (or other colors) and each may be combined in a manner dictated by the music to provide a desired visual effect. In addition, amounts of the light and movement of the light can be dictated by various components of the music to create additional visual effects.

Other visualization effects may also be accomplished to generate imagery based on a piece of music. Changes in music's loudness and frequency spectrum are properties that can be used as inputs to a visualization system. Imagery may include a number of graphics, colors, etc., provided in any desired animated manner to be displayed with music being played, for example.

SUMMARY

In one example, a method of rendering a textual animation is provided that comprises receiving an audio sample of an audio signal comprising at least one of audio elements and vocal elements. The audio signal is being rendered by a media rendering source. The method also comprises receiving one or more descriptors for the audio signal based on at least one of a semantic vector, an audio vector, and an emotion vector. The semantic vector indicates a semantic content of corresponding textual transcriptions of vocal elements of the audio signal as a function of time with respect to a length of the audio signal, the audio vector indicates an audio content of audio elements of the audio signal as a function of time with respect to a length of the audio signal, and the emotion vector indicates an emotional content of audio elements of the audio signal as a function of time with respect to a length of the audio signal. The method also comprises based on the one or more descriptors, a client device rendering the textual transcriptions of vocal elements of the audio signal in an animated manner.

In another example, a method of rendering a textual animation comprises receiving an audio sample of an audio signal comprising at least one of audio elements and vocal elements, and the audio signal is being rendered by a media rendering source. The method also comprises determining an identification of a song corresponding to the audio sample and lyrics corresponding to the vocal elements, and receiving a set of descriptors for the song based on at least one of a semantic vector, an audio vector, and an emotion vector. The semantic vector indicates a semantic content of the lyrics as a function of time with respect to a length of the song, the audio vector indicates an audio content of audio elements of the song as a function of time with respect to a length of the song, and the emotion vector indicates an emotional content of audio elements of the song as a function of time with respect to a length of the song. The method also includes based on the set of descriptors, a client device rendering the lyrics in an animated manner and substantially in synchrony to the audio signal being rendered by the media rendering source.

In still another example, a method is provided comprising receiving an audio sample, and determining an identification of a song corresponding to the audio sample. The song comprises at least one of audio elements and vocal elements. The method also comprises retrieving one or more descriptors for the song based on at least one of a semantic vector, an audio vector, and an emotion vector. The semantic vector indicates a semantic content of corresponding textual transcriptions of the vocal elements as a function of time with respect to a length of the song, the audio vector indicates an audio content of the audio elements as a function of time with respect to a length of the song, and the emotion vector indicates an emotional content of the audio elements as a function of time with respect to a length of the song. The method also comprises sending to a client the one or more descriptors.

Any of the methods described herein may be provided in a form of instructions stored on a non-transitory, computer readable storage medium, that when executed by a computing device, perform functions of the method. Further embodiments may also include articles of manufacture including a tangible computer-readable media that have computer-readable instructions encoded thereon, and the instructions may comprise instructions to perform functions of the methods described herein.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure may describe, inter alia, systems and methods of rendering a textual animation. The methods include receiving an audio sample of an audio signal that is being rendered by a media rendering source. The methods also may include receiving one or more descriptors for the audio signal based on at least one of a semantic vector, an audio vector, and an emotion vector. Based on the one or more descriptors, a client device may render the textual transcriptions of vocal elements of the audio signal in an animated manner. The client device may further render the textual transcriptions of the vocal elements of the audio signal to be substantially in synchrony to the audio signal being rendered by the media rendering source. In addition, the client device may further receive an identification of a song corresponding to the audio sample, and may render lyrics of the song in an animated manner.

I. Content Identification System

Figure 1:
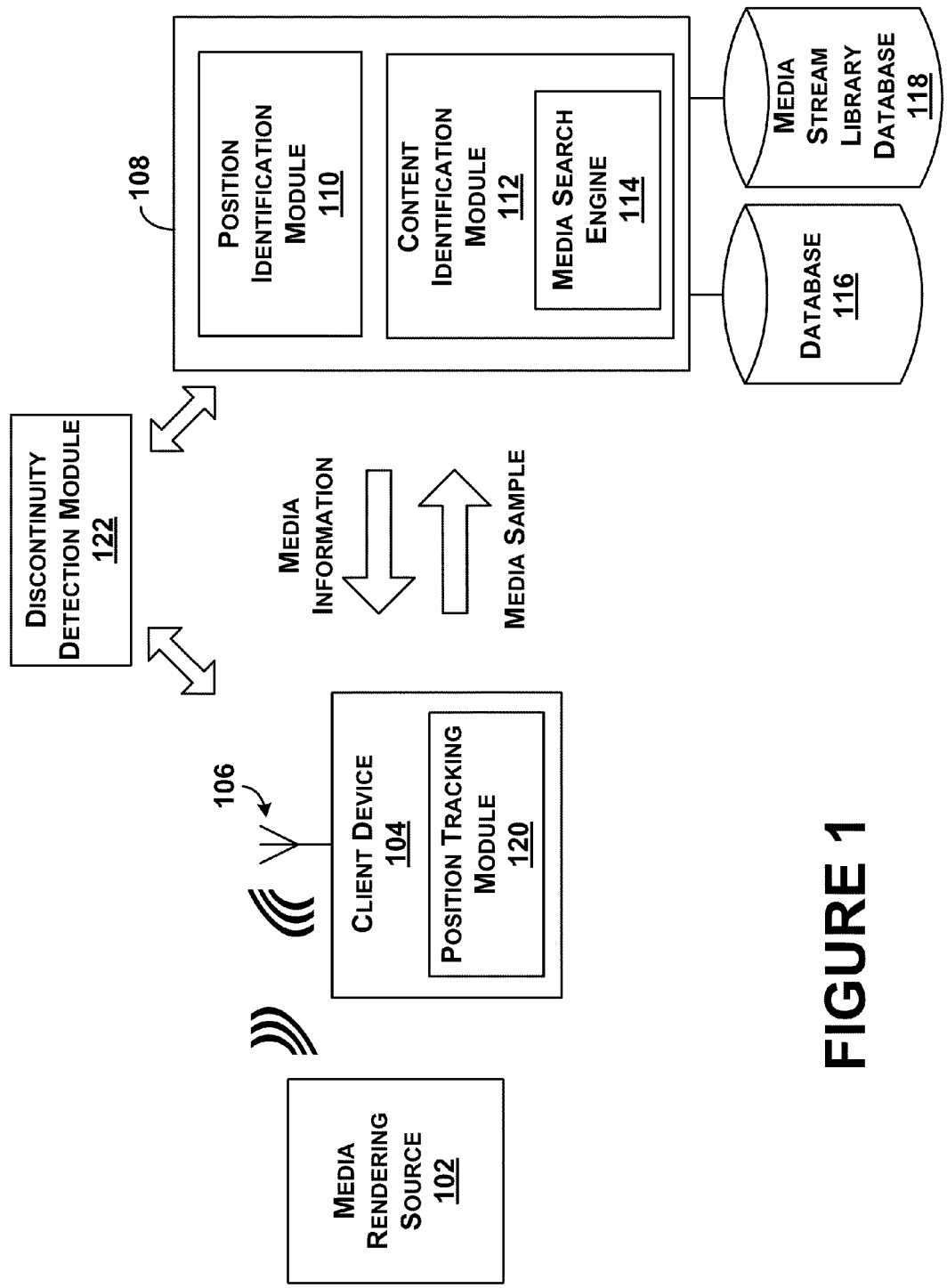
FIG. 1 illustrates an example of a system for identifying media content, and synchronizing data with the identified media content.

Referring now to the figures, FIG. 1 illustrates one example of a system for identifying media content, and synchronizing data with the identified media content. The system includes a media rendering source 102 that renders and presents media content from a media stream. The media stream may be stored on the media rendering source 102 or received from external sources, such as an analog or digital broadcast. In one example, the media rendering source 102 may be a radio station or a television content provider that broadcasts media streams (e.g., audio and/or video) and/or other information. The media rendering source 102 may also be any type of device that plays audio media, or displays video media in a recorded or live format. In an alternate embodiment, the media rendering source 102 may include a live performance as a source of audio and/or a source of video, for example.

The media rendering source 102 may render or present the media stream through a graphical display, audio speakers, a MIDI musical instrument, an animatronic puppet, etc., or any other kind of presentation provided by the media rendering source 102, for example.

A client device 104 may be configured to receive a rendering of the media stream from the media rendering source 102 through a sample capture module encompassing a media receiver 106. In FIG. 1, the media receiver 106 is shown to be an antenna, and the media rendering source 102 broadcasts the media stream wirelessly to the client device 104. However, depending on a form of the media stream, the media rendering source 102 may render the media using wireless or wired communication techniques.

In other examples, the media receiver 106 can include any of a microphone, video camera, vibration sensor, radio receiver, network interface, etc. As a specific example, the media rendering source 102 may play music or songs, and the client device 104 may include a microphone to receive a sample of the music or songs.

In one example, the client device 104 is not operationally coupled to the media rendering source 102, other than to receive the rendering of the media stream. In this manner, the client device 104 is not controlled by the media rendering source 102, nor is the client device 104 an integral portion of the media rendering source 102. In the example shown in FIG. 1, the client device 104 is a separate entity from the media rendering source 102.

In another example, the client device 104 may be operationally coupled to the media rendering source 102.

The client device 104 may be configured to capture a media sample of the rendered media stream. This may occur automatically without user intervention or may be triggered by a user activating a button or other application to trigger the sample capture. For example, the user of the client device 104 may press a button to record a ten (10) second digital sample of audio through a microphone, or to capture a still image or video sequence using a camera.

The client device 104 can be implemented as a portion of a small-form factor portable (or mobile) electronic device such as a cell phone, a wireless cell phone, a personal data assistant (PDA), a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device 104 can be operated to capture portions of the media sample rendered by the media rendering source 102 for identification and position information. As an example, the client device 104 may be coupled to a server 108 that includes a position identification module 110 and a content identification module 112. Although FIG. 1 illustrates the server 108 to include both the position identification module 110 and the content identification module 112, either of the position identification module 110 and/or the content identification module 112 may be separate entities apart from the server 108, for example. Alternatively, both the position identification module 110 and the content identification module 112 may be the same entity, or functions of the position identification module 110 and the content identification module 112 may be performed by the same entity. In addition, the position identification module 110 and/or the content identification module 112 may be located in the client device 104 or may be on a remote server connected to the client device 104 over a network, as shown in FIG. 1.

The server 108 may be configured to receive a media sample from the client device 104 (either over a wired or wireless connection), and the position identification module 110 can identify a corresponding estimated time position ($T_S$) indicating a time offset of the media sample into the media stream based on the media sample that is being captured at that moment. $T_S$ may also, in some examples, be an elapsed amount of time from a beginning of the media stream.

The content identification module 112 may optionally also perform a content identification on the received media sample. The content identification identifies a media stream if the identity is not already known. The content identification module 112 may use or be incorporated within any of the example media sample information retrieval systems, such as provided by Shazam Entertainment in London, United Kingdom, Gracenote in Emeryville, Calif., or Melodis in San Jose, Calif., for example. These services may operate to receive samples of environmental audio, identify a musical content of the audio sample, and provide the user with information about the music, including the track name, artist, album, artwork, biography, discography, concert tickets, etc.

In this regard, the content identification module 112 includes a media search engine 114 and may include or have access to a database 116 that indexes reference media streams, for example, to compare the received media sample with the stored information so as to identify tracks within the received media sample. Once tracks within the media stream have been identified, track identities or other information may be reported back to the client device 104.

Alternatively, the client device 104 may capture a sample of a media stream from the media rendering source 102, and perform initial processing on the sample so as to create a fingerprint of the media sample. The client device 104 could then send the fingerprint information to the position identification module 110 and/or the content identification module 112, which may identify information pertaining to the sample based on the fingerprint information alone. In this manner, more computation or identification processing can be performed at the client device 104, rather than at the position identification module 110 and/or the content identification module 112, for example.

As mentioned, the database 116 may include many media recordings and each recording may be identified by a unique identifier (e.g., sound_ID). The database 116 may not store audio or video files for each recording, since the sound_IDs can be used to retrieve audio files from elsewhere. However, the database 116 may store the audio or video files in some examples. A sound database index may be very large, containing indices for millions or even billions of files, for example. New recordings can be added to the database index.

The database 116 may also include information for each stored audio, video, or media file, or for each stored media index. For example, metadata may be stored with each file that indicates information about the file, such as an artist name, a length of song, lyrics of the song, time indices for lines or words of the lyrics, album artwork, graphics/images to display for the song or while the song is playing, or any other identifying or related information to the file.

The system of FIG. 1 allows time offsets of captured media samples to be identified, and also for media samples to be identified based on stored information. While FIG. 1 illustrates a system that has a given configuration, the components within the system may be arranged in other manners. For example, the media search engine 114 may be separate from the content identification module 112, or media sample processing can occur at the client 104 or at the server 108. Thus, it should be understood that the configurations described herein are merely exemplary in nature, and many alternative configurations might also be used.

The system in FIG. 1, and in particular the position identification module 110, may identify time offsets of media samples within a media stream. Optionally, the system can be used to identify content in a media stream using samples of the media within the media stream using the content identification module 112.

Various media sample identification techniques are known in the art for performing computational content identifications of media samples and features of media samples using a database of media tracks. The following U.S. patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450,531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; and Blum, et al, U.S. Pat. No. 5,918,223, entitled "Method and Article of Manufacture for Content-Based Analysis, Storage, Retrieval, and Segmentation of Audio Information".

Briefly, identifying a media recording may begin by receiving the media recording and sampling the media recording. The recording can be correlated with digitized, normalized reference signal segments to obtain correlation function peaks for each resultant correlation segment, providing a recognition signal when the spacing between the correlation function peaks is within a predetermined limit, and a pattern of RMS power values coincident with the correlation function peaks matches within predetermined limits of a pattern of the RMS power values from the digitized reference signal segments, as noted in U.S. Pat. No. 4,450,531, for example. The matching media content can thus be identified. Furthermore, the matching position of the media recording in the media content is given by the position of the matching correlation segment, as well as the offset of the correlation peaks, for example.

In another example, generally, media content can be identified by identifying or computing characteristics or fingerprints of a media sample and comparing the fingerprints to previously identified fingerprints. The particular locations within the sample at which fingerprints are computed depend on reproducible points in the sample. Such reproducibly computable locations are referred to as "landmarks." A location within the sample of the landmarks can be determined by the sample itself, i.e., is dependent upon sample qualities and is reproducible. That is, the same or similar landmarks may be computed for the same signal each time the process is repeated. A landmarking scheme may mark about 5 to about 10 landmarks per second of sound recording; however, landmarking density depends on an amount of activity within the media recording. One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been computed, a fingerprint can be computed at or near each landmark time point in the recording. A nearness of a feature to a landmark is defined by the fingerprinting method used. In some cases, a feature is considered near a landmark if the feature clearly corresponds to the landmark and not to a previous or subsequent landmark. In other cases, features correspond to multiple adjacent landmarks. The fingerprint is generally a value or set of values that summarizes a set of features in the recording at or near the time point. In one embodiment, each fingerprint is a single numerical value that is a hashed function of multiple features.

Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, to Wang and Smith, entitled "System and Methods for Recognizing Sound and Music Signals in High Noise and Distortion," the entire disclosure of which is herein incorporated by reference as if fully set forth in this description.

Thus, the content identification module 112 may receive a recording and compute fingerprints of the recording. The content identification module 112 may compute the fingerprints by communicating with additional recognition engines. To identify the recording, the content identification module 112 can then access the database 116 to match the fingerprints of the recording with fingerprints of known audio tracks by generating correspondences between equivalent fingerprints and files in the database 116 to locate a file that has a largest number of linearly related correspondences, or whose relative locations of characteristic fingerprints most closely match the relative locations of the same fingerprints of the recording, for example. That is, linear correspondences between the landmark pairs can be identified, and sets can be scored according to the number of pairs that are linearly related. A linear correspondence may occur when a statistically significant number of corresponding sample locations and file locations can be described with substantially the same linear equation, within an allowed tolerance, for example. The file of the set with a highest statistically significant score, i.e., with a largest number of linearly related correspondences, is the winning file, and may be determined to be the matching media file.

As yet another example of a technique to identify content within the media stream, a media sample can be analyzed to identify its content using a localized matching technique. For example, generally, a relationship between two media samples can be characterized by first matching certain fingerprint objects derived from the respective samples. A set of fingerprint objects, each occurring at a particular location, is generated for each media sample. Each location may be determined depending upon content of a respective media sample and each fingerprint object may characterize one or more local features at or near the respective particular location. A relative value is next determined for each pair of matched fingerprint objects. A histogram of the relative values is then generated. If a statistically significant peak is found, the two media samples can be characterized as substantially matching. Additionally, a time stretch ratio, which indicates how much an audio sample has been sped up or slowed down (in terms of playback) as compared to the original or reference audio track can be determined. For a more detailed explanation of this method, the reader is referred to U.S. Pat. No. 7,627,477, to Wang and Culbert, entitled Robust and Invariant Audio Pattern Matching, the entire disclosure of which is herein incorporated by reference as if fully set forth in this description.

In addition, systems and methods described within the publications above may return more than the identity of a media sample. For example, using the method described in U.S. Pat. No. 6,990,453 to Wang and Smith may return, in addition to metadata associated with an identified audio track, a relative time offset (RTO) of a media sample from a beginning of an identified sample. To determine a relative time offset of the recording, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the sample) and a first fingerprint of the stored original file will be a time offset of the sample, e.g., amount of time into a song. Thus, a relative time offset (e.g., 67 seconds into a song) at which the sample was taken can be determined. Other information may be used as well to determine the RTO. For example, a location of a histogram peak may be considered the time offset from a beginning of the reference recording to the beginning of the sample recording.

Other forms of content identification may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined.

Furthermore, other forms of content identification may also be performed, such as using watermarking methods. A watermarking method can be used by the position identification module 110 to determine the time offset, for example, in an instance in which the media stream has embedded watermarks at intervals, and each watermark specifies a time or position of the watermark either directly, or indirectly via a database lookup, for example. Alternatively, if the media stream includes embedded watermarks that indicate, either directly or indirectly, a time or position offset value, the client device 104 may determine the time offset of a sample of the media being rendered without communication with the position identification module 110.

In each of the foregoing example content identification methods for implementing the content identification module 112, a byproduct of the identification process may be a time offset of the media sample within the media stream. Thus, in these cases, the position identification module 110 may be the same as the content identification module 112, or functions of the position identification module 110 may be performed by the content identification module 112.

Thus, a user may send from the client device 104 a position identification query to the position identification module 110, which may use any of the techniques described herein to return information relating to the content to the client device 104, and optionally, the content identification module 112 may be accessed to identify the content. Example embodiments described herein apply to any type of media stream, such as for example, pre-recorded or live music, audio, video, a combination of audio and video, or any other kind of media or event sequences that follow a timeline of positions in the media stream. Example embodiments also apply to any format of the media stream such as, for example, media on CDs, DVDs, compressed digital media, MIDI files, animation sequences, control sequences, scripts, slide shows, etc.

In example embodiments, the client device 104 or the server 108 may further access a media stream library database 118 to select a media stream corresponding to the sampled media that may then be returned to the client device 104 to be rendered by the client device 104. The media stream library database 118 may be located in the client device 104 or in the server 108, or alternatively either or both of the client device 104 and the server 108 may be connected to the media stream library database 118 over a network. In FIG. 1, the media stream library database 118 is shown to be connected to the server 108, for example. Still further, information in the media stream library database 118, or the media stream library database 118 itself, may be included within the database 116.

A media stream corresponding to the media sample may be manually selected by a user of the client device 104, programmatically by the client device 104, or selected by the server 108 based on an identity of the media sample determined by the content identification module 112, for example. The selected media stream may be a different kind or same kind of media as the media sample, and may be synchronized to the media being rendered by the media rendering source 102. For example, the media sample may be music, and the selected media stream may be lyrics, a musical score, a guitar tablature, musical accompaniment, a video, animatronic puppet dance, an animation sequence, etc., which can be synchronized to the music. The client device 104 may receive the selected media stream corresponding to the media sample, and may render the selected media stream in synchrony (or substantially in synchrony) with the media being rendered by the media rendering source 102.

An estimated time position of the media being rendered by the media rendering source 102 is determined by the position identification module 110 and used to determine a corresponding position within the selected media stream at which to render the selected media stream. The client device 104 can then render and present the selected media stream in synchrony with the media being rendered by the media rendering source 102.

The client device 104 may include a position tracking module 120 to determine accurate synchronization between the two media streams. When the client device 104 is triggered to capture a media sample, a timestamp ($T_0$) is recorded from a reference clock of the client device 104. At any time t, an estimated real-time media stream position $T_r(t)$ is determined from the estimated identified media stream position $T_S$ plus elapsed time since the time of the timestamp:

$$T_r(t) = T_S + t - T_0 \qquad \text{Equation (1)}$$

$T_r(t)$ is an elapsed amount of time from a beginning of the media stream to a real-time position of the media stream as is currently being rendered. Thus, using $T_S$ (i.e., the estimated elapsed amount of time from a beginning of the media stream to a position of the media stream based on the recorded sample), the $T_r(t)$ can be calculated. $T_r(t)$ is then used by the client device 104 to present the selected media stream in synchrony with the media being rendered by the media rendering source 102. For example, the client device 104 may begin rendering the selected media stream at the time position $T_r(t)$, or at a position such that $T_r(t)$ amount of time has elapsed.

The position tracking may fall out of synchrony for many reasons. In one instance, the media stream may be rendered by the media rendering source 102 at an unexpected speed. For example, if a musical recording is being played on an uncalibrated turntable or CD player, the music recording could be played faster or slower than expected, or in a manner differently from the stored reference media stream. Or, sometimes a DJ may change a speed of a musical recording intentionally to achieve a certain effect, such as matching a tempo across a number of tracks. In such instances, the estimated position $T_r(t)$ can become incorrect as t increases, and consequently, the selected media stream may be out of sync.

In some embodiments, to mitigate or prevent the selected media stream from falling out of synchrony with the media being rendered by the media rendering source 102, the estimated position $T_r(t)$ can be adjusted according to a speed adjustment ratio R. For example, methods described in U.S. Pat. No. 7,627,477, entitled "Robust and invariant audio pattern matching", the entire contents of which are herein incorporated by reference, can be performed to identify the media sample, the estimated identified media stream position $T_S$, and a speed ratio R.

To estimate the speed ratio R, cross-frequency ratios of variant parts of matching fingerprints can be calculated, and because frequency is inversely proportional to time, a cross-time ratio is the reciprocal of the cross-frequency ratio. A cross-speed ratio R is the cross-frequency ratio (e.g., the reciprocal of the cross-time ratio).

More specifically, using the methods described above, a relationship between two audio samples can be characterized by generating a time-frequency spectrogram of the samples (e.g., computing a Fourier Transform to generate frequency bins in each frame), and identifying local energy peaks of the spectrogram. Information related to the local energy peaks is extracted and summarized into a list of fingerprint objects, each of which optionally includes a location field, a variant component, and an invariant component. Certain fingerprint objects derived from the spectrogram of the respective audio samples can then be matched. A relative value is determined for each pair of matched fingerprint objects, which may be, for example, a quotient or difference of logarithm of parametric values of the respective audio samples.

In one example, local pairs of spectral peaks are chosen from the spectrogram of the media sample, and each local pair comprises a fingerprint. Similarly, local pairs of spectral peaks are chosen from the spectrogram of a known media stream, and each local pair comprises a fingerprint. Matching fingerprints between the sample and the known media stream are determined, and time differences between the spectral peaks for each of the sample and the media stream are calculated. For instance, a time difference between two peaks of the sample is determined and compared to a time difference between two peaks of the known media stream. A ratio of these two time differences can be compared and a histogram can be generated comprising many of such ratios (e.g., extracted from matching pairs of fingerprints). A peak of the histogram may be determined to be an actual speed ratio (e.g., difference between speed at which the media rendering source 102 is playing the media compared to speed at which media is rendered on reference media file). Thus, an estimate of the speed ratio R can be obtained by finding a peak in the histogram, for example, such that the peak in the histogram characterizes the relationship between the two audio samples as a relative pitch, or, in case of linear stretch, a relative playback speed.

Thus, the global relative value (e.g., speed ratio R) can be calculated from matched fingerprint objects using corresponding variant components from the two audio samples. The variant component may be a frequency value determined from a local feature near the location of each fingerprint object. The speed ratio R could be a ratio of frequencies or delta times, or some other function that results in an estimate of a global parameter used to describe the mapping between the two audio samples. The speed ratio R may be considered an estimate of the relative playback speed, for example.

The speed ratio R can be estimated using other methods as well. For example, multiple samples of the media can be captured, and content identification can be performed on each sample to obtain multiple estimated media stream positions $T_S(k)$ at reference clock time $T_0(k)$ for the k-th sample. Then, R could be estimated as:

$$R_k = \frac{T_S(k) - T_S(1)}{T_0(k) - T_0(1)} \quad \text{Equation (2)}$$

To represent R as time-varying, the following equation may be used:

$$R_k = \frac{T_S(k) - T_S(k-1)}{T_0(k) - T_0(k-1)} \quad \text{Equation (3)}$$

Thus, the speed ratio R can be calculated using the estimated time positions $T_S$ over a span of time to determine the speed at which the media is being rendered by the media rendering source 102.

Using the speed ratio R, an estimate of the real-time media stream position can be calculated as:

$$T_r(t) = T_S + R(t - T_0) \quad \text{Equation (4)}$$

The real-time media stream position indicates the position in time of the media sample. For example, if the media sample is from a song that has a length of four minutes, and if $T_r(t)$ is one minute, that indicates that one minute of the song has elapsed.

The system in FIG. 1 may further include a discontinuity detection module 122, which may be included within the client device 104 and/or the server 108, or functions of the discontinuity detection module 122 may optionally be performed by components of the client device 104 and/or components of the server 108, for example. Alternatively, as shown in FIG. 1, the discontinuity detection module 122 may be a separate entity that communicates with the client device 104 and/or the server 108 using wireless or wired communication techniques, for example.

The discontinuity detection module 122 may detect if the media stream being rendered by the media rendering source 102 is interrupted unexpectedly. This may occur, for example, if a channel is changed on the media rendering source 102, or if playout of the media stream stops or skips to a different position in the media stream. If the selected media stream from the media stream library database 118 were to continue to play, the two media streams would be out of sync or disconnected. The discontinuity detection module 122 may either stop the selected media stream or attempt to resynchronize the two media streams. Thus, the discontinuity detection module 122 may verify whether the selected media stream is being rendered in synchrony with the media stream being rendered by the media rendering source 102.

The discontinuity detection module 122 functions may be implemented by performing periodic position and/or content identification samplings as outlined above as an example method to calculate the speed ratio R, and thus, the discontinuity detection module 122 may communicate with the server 108. If at some point, content identifications are no longer successful, the media stream being rendered by the media rendering source 102 has stopped. Or, if a different media stream is identified then perhaps a channel changed, a new track is being played, etc.

To determine discontinuities in a media stream being rendered by the media rendering source 102, the discontinuity detection module 122 can periodically receive media samples from the client device 104 and perform fingerprint extraction on the media samples. The discontinuity detection module 122 may also receive information from the position identification module 110 including an alignment file that includes a number of fingerprints of the reference media stream throughout the media stream. The discontinuity detection module 122 may then compare the extracted fingerprints from the periodically received media samples to the fingerprints in the alignment file to determine if the media stream being rendered by the media rendering source 102 has been interrupted. When no identifiable fingerprint matches are found, the discontinuity detection module 122 may determine that the media stream has been interrupted or ended.

Fingerprint matching can also be performed using, for example, methods described above, or as described in U.S. Pat. No. 6,990,453, to Wang and Smith.

In addition, the discontinuity detection module 122 may have knowledge of the content identification of the media stream (from the content identification module 112), and thus, may receive a file of fingerprints for the media stream. The discontinuity detection module 122 will anticipate certain fingerprints to appear in the samples at predetermined times, and if the expected fingerprints are not seen, then a discontinuity may be determined. For example, if a certain amount of time has passed with no predetermined fingerprint matches, then a discontinuity can be determined.

Upon determining a type of discontinuity, the discontinuity detection module 122 can do one of several things. In one example, based on detection of a speed drift, the discontinuity detection module 122 can make an adjustment to the speed ratio R so as to perform a resynchronization of the media streams. In another example, based on detection of a large discontinuity, the discontinuity detection module 122 can use the position identification module 110 to realign the media streams so as to perform a resynchronization of the media streams. In still another example, the discontinuity detection module 122 can use the content identification module 112 to detect a new media stream and choose a different matched media stream and a new position within the new stream for synchronization. In yet another example, if position and/or content identifications fail, the discontinuity detection module 122 can instruct the client device 104 to stop rendering the selected media.

The client device 104 may receive a notification from the discontinuity detection module 122 and then stop displaying the selected media stream or change to display a new media stream selected from the media stream library database 118 synchronized to the new media stream being rendered from the media rendering source 102, for example.

The discontinuity detection module 122 may alternatively thus perform or instruct the client device 104 to perform updates on alignment of the selected media from the media stream library database 118 with the media being rendered by the media rendering source 102. The discontinuity detection module 122 may determine, based on a mis-predicted alignment of fingerprint matches, an offset value at which to adjust the rendering of the selected media on the client device 104 so that the selected media is realigned and synchronized with the rendering of the media stream by the media rendering source 102.

Alternatively, if the discontinuity detection module 122 no longer identifies matching fingerprints from the periodically received media samples to the fingerprints in the alignment file, the discontinuity detection module 122 may inform the client device 104 to perform a resynchronization of the selected media from the media stream library database 118 with the media being rendered by the media rendering source 102. To do so, the client device 104 may re-perform the method of capturing a new sample of the media and sending the new sample to the position identification module 110 to determine the time offset.

Still, alternatively, based on the continued absence of fingerprint matches, the discontinuity detection module 122 may determine that the media stream is no longer being rendered, for example if the position detection module 110 detects no matching time offset, and thus, may instruct the client device 104 to stop rendering the selected media or to perform a new content identification, for example. The client device 104 may send the new sample to the content identification module 112 to identify a new media stream being rendered by the media rendering source 102. If the identified media stream has changed then the client device 104 may select a new media stream from the media stream library database 118 corresponding to the media sample to be rendered in synchrony by the client device 104.

II. Content Synchronization

Figure 2:
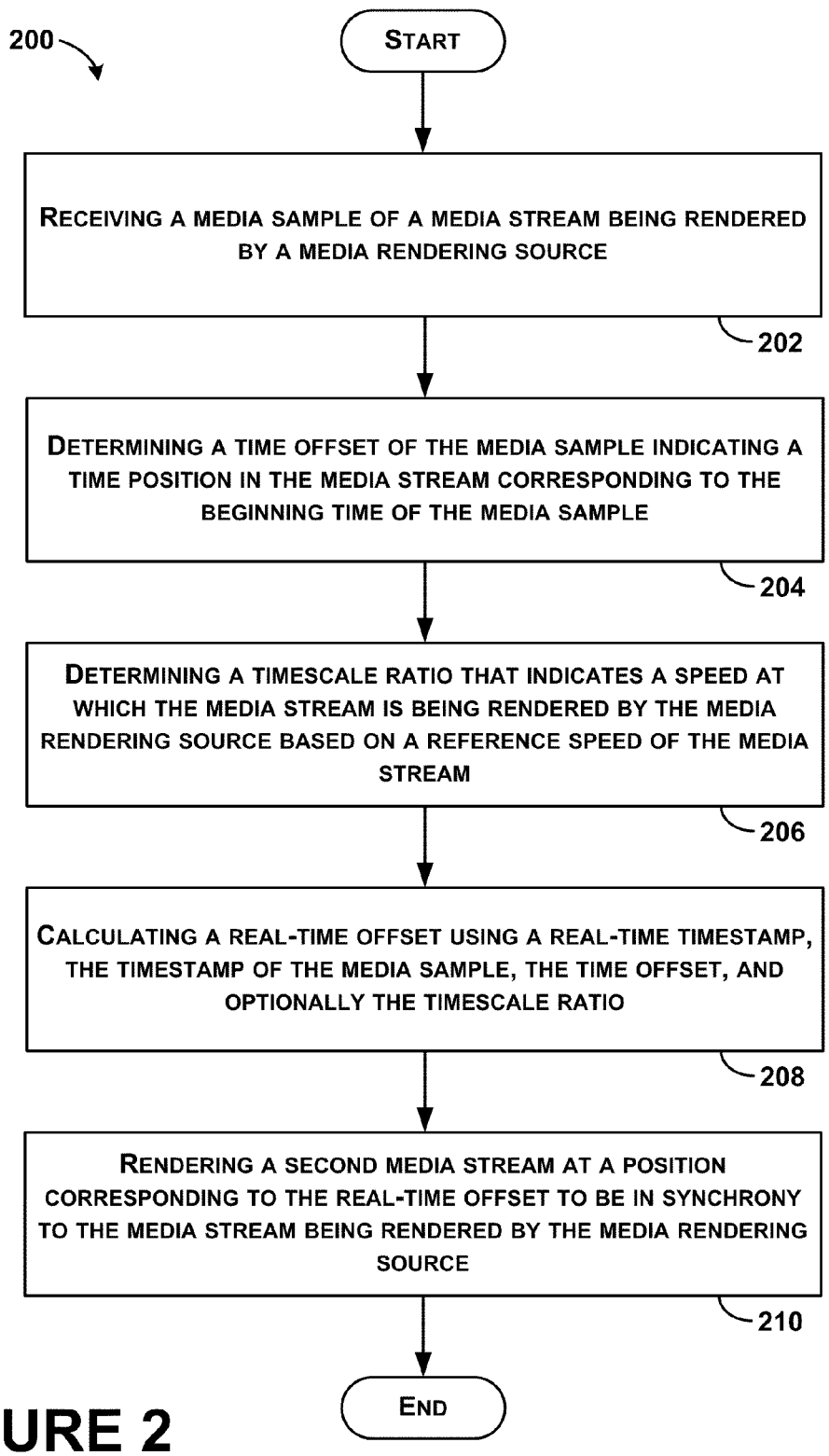
FIG. 2 shows a flowchart of an illustrative embodiment of a method for synchronizing media streams.

FIG. 2 shows a flowchart of an illustrative embodiment of a method 200 for synchronizing media streams. Method 200 shown in FIG. 2 presents an embodiment of a method that, for example, could be used with the system of FIG. 1, for example, and portions of the method may be performed by a client device, a server, or a combination of the client device and the server. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, each block in FIG. 2 may represent circuitry that is wired to perform the specific logical functions in the process. Alternative implementations are included within the scope of the example embodiments of the present disclosure in which functions may be executed out of order from that shown or discussed.

Initially, at block 202, a client device receives a media sample of a media stream being rendered by a media rendering source. The client device may receive the media sample by recording the media sample as the media stream is being rendered. The media sample is associated with or has a timestamp corresponding to a beginning time of the media sample. For example, the client device may capture a sample of the media stream being rendered, and record a time that the sample is recorded based on a clock on the client device.

A time offset of the media sample can then be determined that indicates a time position in the media stream corresponding to the beginning time of the media sample, as shown at block 204. For example, the client device may send the sample of the media stream to a position identification module that will return an identification of the media sample and the time offset. Alternatively, the client device may determine the time offset.

Optionally, a timescale ratio is then determined that indicates a speed at which the media stream is being rendered by the media rendering source based on a reference speed of the media stream, as shown at block 206. The timescale ratio can be determined by the client device, or by a server and returned to the client device. The timescale ratio is not necessary to synchronize media streams; however, the timescale ratio may be included in some embodiments.

A real-time offset that indicates a present time is then determined using a real-time timestamp, the timestamp of the media sample, the time offset, and optionally the timescale ratio, as shown at block 208. The real-time offset may be calculated using Equation (1) or Equation (4) described above.

The client device can then render a second media stream at a position corresponding to the real-time offset to be in synchrony to the media stream being rendered by the media rendering source, as shown at block 210. The client device may receive the second media stream, or may select the second media stream from memory or from a database, for example, based on an identity of the media stream being rendered by the media rendering source. The second media stream may be related to the media stream being rendered by the media rendering source.

In one embodiment, the method 200 may be performed to synchronize a display of song lyrics on a first device to a song being played by a second device or media rendering source. A user of the first device may thus view lyrics corresponding to identified ambient music in real-time. The lyrics text may be displayed at a temporal position in synchrony with the ambient music. In one example, the lyrics text may be scrolled across a display on the first device as the song is being played by the second device in a manner so that the lyrics text are displayed at a time when the lyrics are being sung.

In this example, a method and system is provided for triggering an information delivery event to a user. A user listening to any media rendering source, e.g., a commercial radio broadcast of popular music at home, may be interested in singing along with a particular song being broadcast, and thus desires to obtain song lyrics. Using a sampling device, such as a mobile (or cellular) phone, video recorder, camera, a personal digital assistant (PDA) or palm pad, a user captures a sample of the media rendering source and transmits the sample to a service provider, for example. To transmit the sample, the user may dial a predetermined telephone number to access a service, and then hold the telephone handset within audible distance of the source of the audio signal (i.e., the speaker of the user's home stereo) to capture a sample of the environment. In this example, the experiential environment includes the music playing on the user's home stereo. Alternatively, the user may use a sampling device to record a sample of the music being played, and may send the sample to a server.

A system employed by the service provider or the server uses a recognition engine to compare the captured sample to music recordings in a database to identify the song and thereby trigger a desired event for the user. In this example, the triggered event is the delivery of lyric information to the user that corresponds to the song recognized from the captured sample.

Event fulfillment, the delivery of the desired song lyrics to the user, may be accomplished in a number of different ways in both real-time and delayed modes. In real-time mode, lyric data is delivered so that the user can read the lyrics to sing along with the song, in time, as the song is being broadcast. Accordingly, data for the song corresponding to the captured sample is read out of a database and transmitted by the service provider to a user device capable of displaying text.

Depending on the display device and user preference, the real-time delivery of lyrics may be transmitted in a batch arrangement where relatively large portions or the entire lyric data is downloaded at a time, or using a discrete arrangement where lyric data is automatically synchronized to the song and transmitted in pieces to the user as the song progresses. For batch delivery, the user may choose to synchronize the display of the lyrics to the song being played (so that the lyrics are displayed at the appropriate time interval in advance of the lyrics being sung or spoken by the song performer on the broadcast), or in some applications, the user device may be configured to perform synchronization of the batch transmission. The service provider may transmit the lyric data to automatically synchronize to the broadcast song without any action required by the user or user device. Such automatic synchronization is implemented through a derivation of the temporal position of the captured sample within the recognized song, and then lyrics may be transmitted to the user device in pieces as the song progresses, for example.

The delayed mode of event fulfillment includes the delivery of lyrics corresponding to the sampled song sometime after the song broadcast. The same delivery methods as with real-time mode may be used along with delivery methods that are characterized as being more time-consuming such as mail, courier, and facsimile transmission.

In an example embodiment, additional user input may be collected via voice or touch-tone (i.e., DTMF tones) to further control lyric delivery or trigger additional events such as transaction events. For example, by interacting with the user through the capture device or the delivery device, the telephone, and text-displaying device respectively, the service provider may provide purchase options to the user to obtain the record album containing the broadcast and identified song for which the lyrics were sought.

Figure 3A:
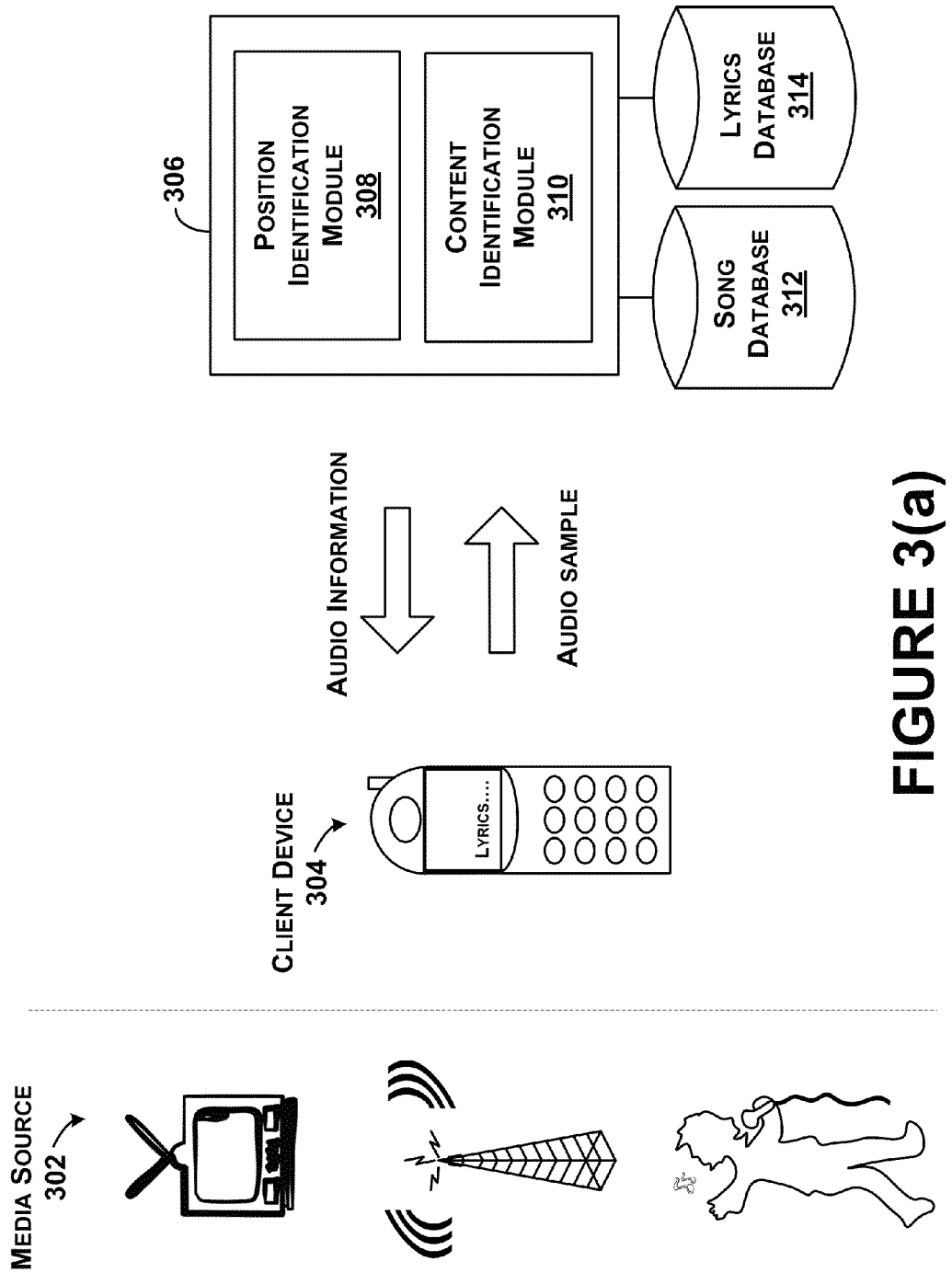
FIGS. 3(a)-3(b) illustrates another example system for identifying media content, and synchronizing data with the identified media content.
Figure 3B:
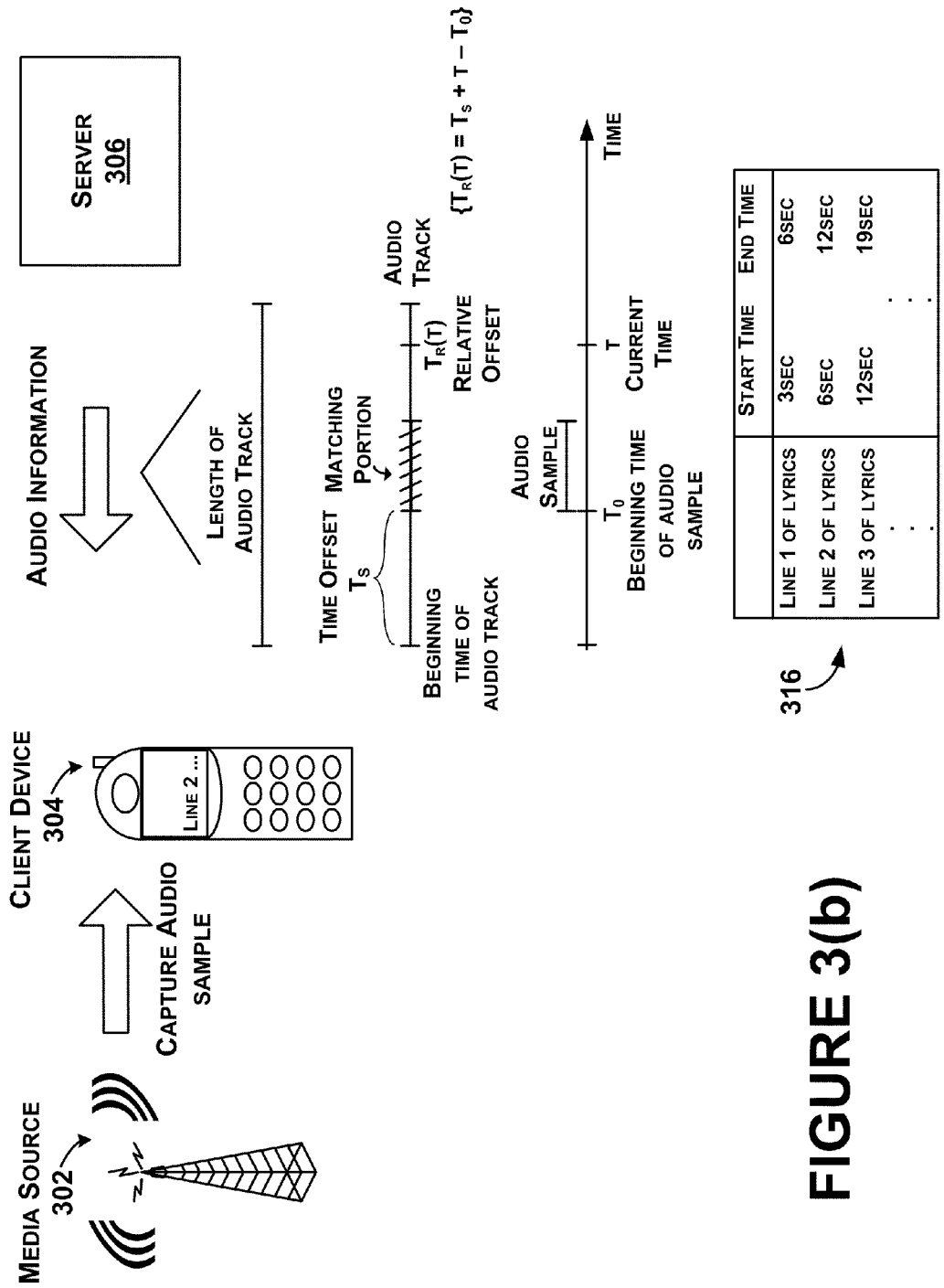

FIGS. 3A-3B illustrate another example of a system for identifying media content, and synchronizing data with the identified media content. In the system of FIG. 3(a), the media content may be a song, and the system is operated to capture a sample of the song being rendered by a random media rendering source 302 using a client device 304, and to identify a time offset of the sample and subsequently provide a synchronized display of lyrics of the song on the client device 304.

The media rendering source 302 can be of any form. Examples shown in FIG. 3(a) include radio and television, pre-recorded audio and video (e.g., tapes, CDs, DVDs, MP3, etc.), media on internet and computer-based systems, live demonstrations or performances. Other examples include telephones, sensory stimuli from ambient surroundings, and other components of elements which may form, alone or in combination, a typical media rendering source.

The client device 304 can be used to capture a sample of a song from the media rendering source 302. The client device 304 may include a microphone or other component to record the sample. The client device 304 may then send the sample to a server 306 via a wireless or wired communication. In the Example shown in FIG. 3(a), the client device 304 communicates with the server 306 via a wireless communication network (not shown). The wireless communication network may be any wireless network, such as any of a cellular wireless network, a wireless local area network (WLAN) or Wi-Fi network, a Bluetooth network or other wireless personal area network (WPAN), a wireless metropolitan area network (WMAN), or a wireless wide area network (WWAN), for example.

The server 306 includes a position identification module 308 and a content identification module 310. However, either of the position identification module 308 and/or the content identification module 310 may be separate entities, or alternatively, the position identification module 308 and/or the content identification module 310 may be the same entity or may have functions performed by the same entity.

The server 306 receives the sample from the client device 304 and performs a content identification using any of the methods described herein. The server 306 may access a song database 312 to compare the sample to known samples of songs, to identify the sample, and to retrieve information about the identified sample. The server 306 may then access a lyrics database 314 to retrieve lyrics of the identified song.

The information about the song and a batch file including all lyrics of the song are then sent to the client device 304, as shown in FIG. 3(b). A portion of the information may include the estimated identified media stream position $T_S$, which the client device 304 can use to calculate the estimated real-time media stream position $T_r(t)$. The estimated identified media stream position $T_S$ is a time within the length of the identified audio track corresponding to a beginning of the audio sample. The lyrics may be time-annotated lyrics 316 that include information as to media stream time positions per line or word of the lyrics. In one example, the lyrics may be included in an XML file that includes time fields comprising the annotations, or the timing information may be embedded within the lyrics in other ways. The client device 304 can then render lyrics at the time position $T_r(t)$ so that the text of the lyrics are displayed in synchrony (e.g., at the same or about the same time) with the lyrics being rendered by the media rendering source 302.

Alternatively, the server 306 may not send the all lyrics of the song to the client device 304 in a file, but rather, may stream the lyrics to the client device 304 in synchrony with the song being rendered by the media rendering source 302. The lyrics may be sent to the client device 304 moments before the lyrics are rendered by the media rendering source 302 so that the client device 304 has time to receive and display the lyrics synchronously with the lyrics rendered by the media rendering source 302.

Figure 4:
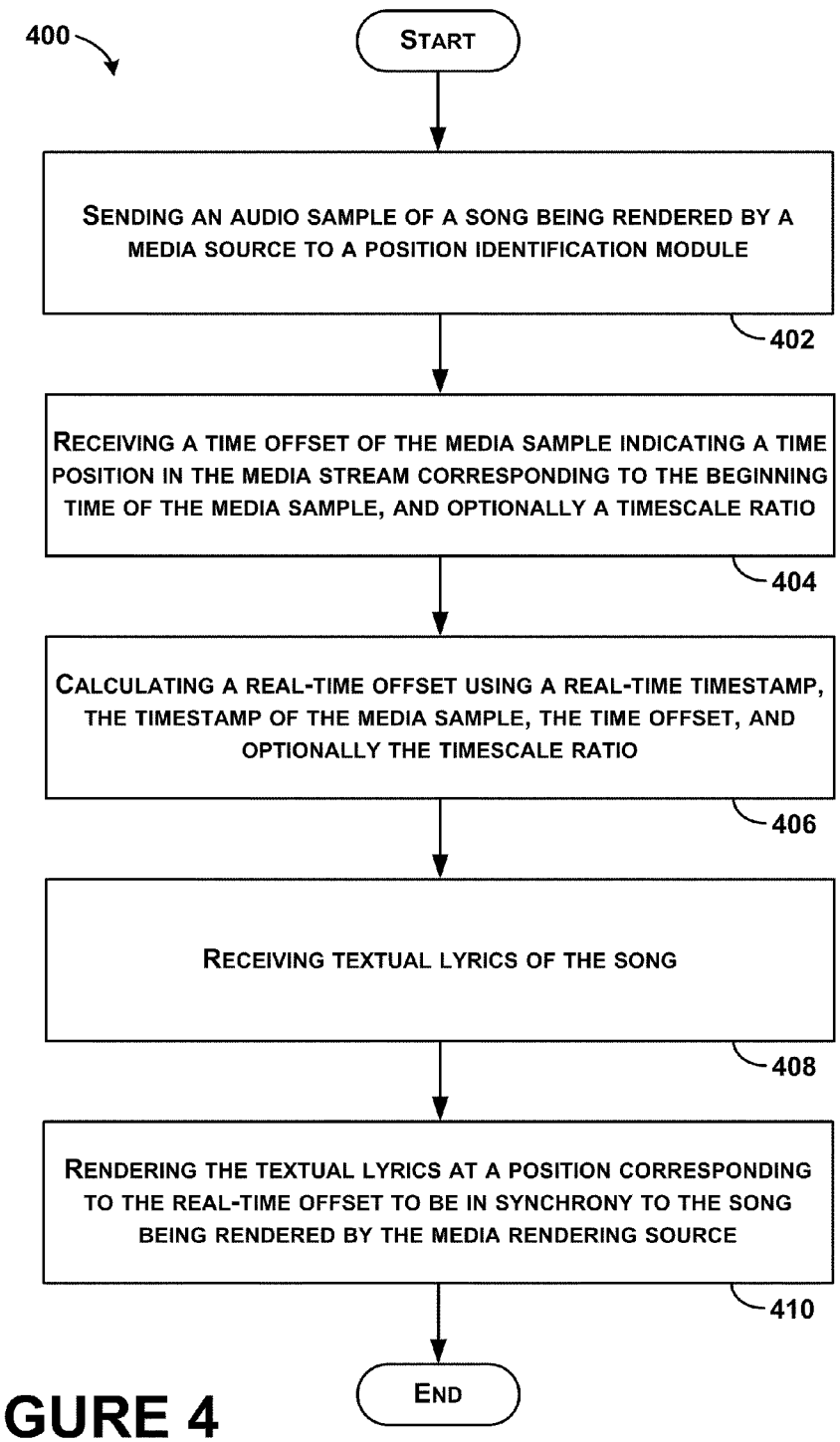
FIG. 4 shows a flowchart of an illustrative embodiment of a method for synchronizing lyrics to a song being rendered by a media rendering source.

FIG. 4 shows a flowchart of an illustrative embodiment of a method 400 for synchronizing lyrics to a song being rendered by a media rendering source. Initially, as shown at block 402, a client device sends an audio sample of a song being rendered by a media rendering source to a position identification module. The audio sample is associated with or has a timestamp ($T_0$) corresponding to a beginning time of the audio sample. The client device will receive from the position identification module a time offset ($T_S$) of the sample indicating a time position in the song corresponding to the beginning time of the audio sample, and optionally a timescale ratio (R) that indicates a speed at which the song is being rendered by the media rendering source based on a reference speed of the song, as shown at block 404. The timescale ratio can optionally be used to correct for differences in a rendering of the song as compared to a reference speed of the song. Thus, the timescale ratio can be used to compensate for time drift in the song.

The client device next calculates a real-time offset using a real-time timestamp that indicates a present time, the timestamp of the audio sample, the time offset, and optionally the timescale ratio, as shown at block 406.

The client device will receive textual lyrics of the song, as shown at block 408. The lyrics may be time-annotated lyrics that include time tags for groups of line, each line, or for words of the lyrics. The time tags may indicate a time position at which the lyrics are sung in the song (e.g., corresponding to an elapsed amount of time). The lyrics may be sent to the client device as a text file, or an XML file, for example. The client device can then render the textual lyrics at a position corresponding to the real-time offset to be in synchrony to the song being rendered by the media rendering source, as shown at block 410. The client device may render the lyrics in a scrolling manner, so that the textual lyrics are displayed at the time that the lyrics are being sung. In addition, the lyrics may be highlighted at times when the words of the lyrics are being sung, a pointer may be used to indicate which lyrics are being sung, or other methods may be used to indicate the words of the lyrics being sung at the time (or at substantially the same time) as the words are being sung, for example. In this regard, the client device may render the lyrics in an animated manner, such that the words of the lyrics are displayed at times when the words are being sung (e.g., in synchrony), or such that all or more words that those currently being sung are displayed but those words being sung are emphasized in an animated manner, for example. Any type of animation may be used to display the lyrics.

The client device may further send additional samples of the song at different or later time periods to the position identification module to receive updates on the time offsets. In this manner, the client device can verify that the lyrics are being displayed in synchrony, for example, over time. The client device may display the lyrics at the updated time offset positions to ensure that the lyrics match the possible changes in the rendering of the song, such as for example, if the musician slows a tempo, or has any interruption in the song.

Using the method 400, a user's device (e.g., cell phone) can record a sample of music being rendered by any type of random media rendering source, and then synchronize lyrics to the song for display on the user's device. The user's device may thus be operated as a live karaoke device, for example.

III. Content Animation

In other examples, rather than or in addition to synchronizing lyrics to the song for display on a client device, the lyrics text may be animated and displayed in various manners on the client device. The animation may be based on various factors including semantic content of the lyric text, emotional content of the lyric text, and/or musical content of the audio signal or song.

Figure 5:
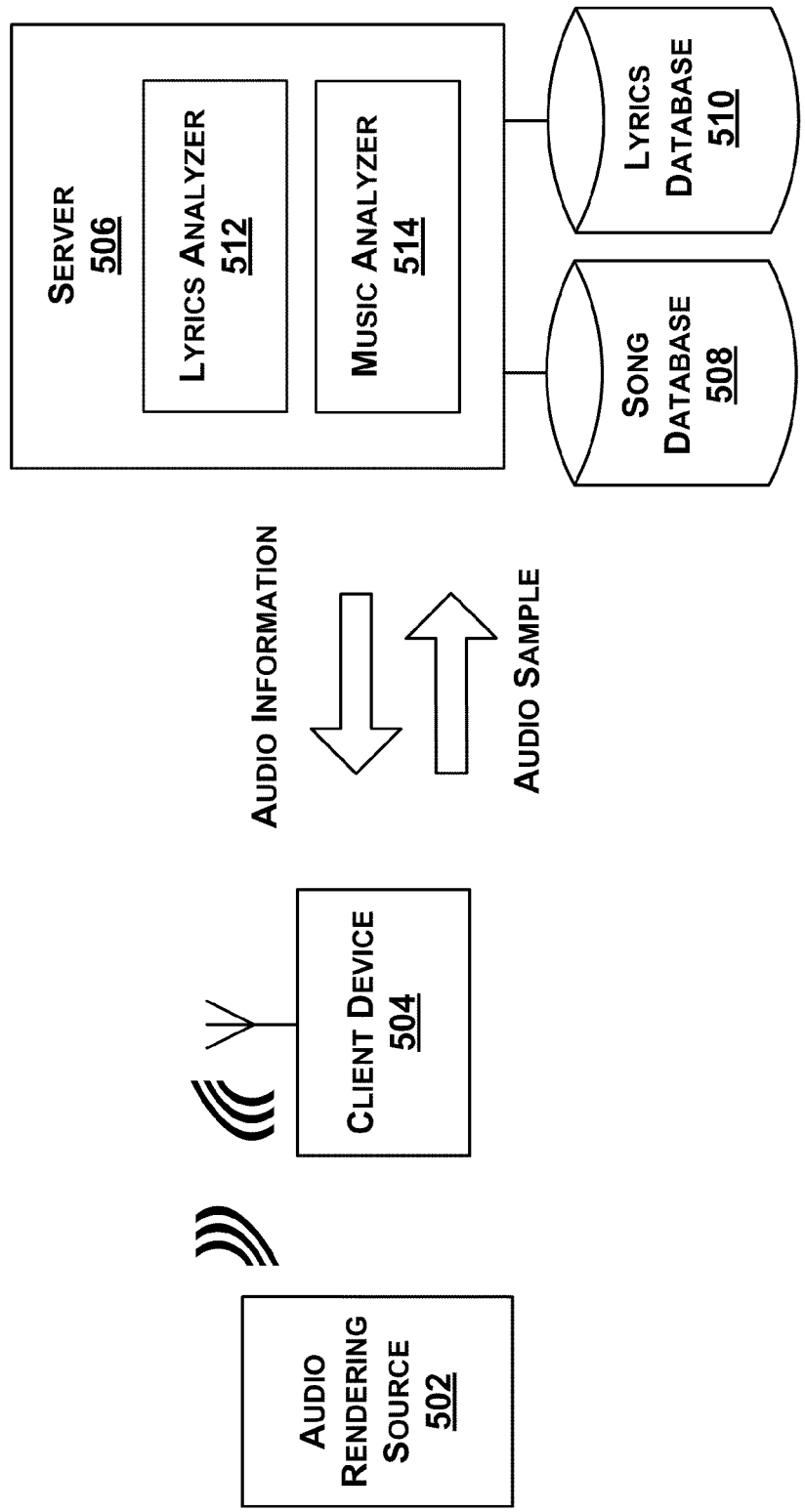
FIG. 5 is an example system configured to provide animated lyrics for display on a client device.

FIG. 5 is an example system configured to provide animated lyrics for display on a client device. The system includes an audio rendering source 502, and a client device 504 that may capture an audio sample of an audio signal being rendered by the audio rendering source 502. The client device 504 is shown to be a mobile device that receives the audio sample of the audio signal that is being broadcast by the audio rendering source 502; however, the client device may be of other forms as well.

The client device 504 may capture and send the audio sample to a server 506, which may operate similarly to the server 108 described above in FIG. 1 to identify the audio signal from which the audio sample was taken, and return an identification of the audio signal to the client device 504. The server 506 may be coupled to a song database 508 and a lyrics database 510, and may also return information to the client device 504 including lyrics of the identified audio signal and timing information to be used to synchronize display of the lyrics with playback of the song by the audio rendering source 502.

In another embodiment, the client device 504 may have audio signals or songs stored on the client device 504, and may send a request for lyric information to the server 506 to receive lyrics for the song and timing information to be used to synchronize display of the lyrics with playback of the song by the client device 504.

The server 506 further includes a lyrics analyzer 512 and a music analyzer 514. Audio signals or songs include data that can be used to determine characteristics of the song, such as an artist, genre, lyrics, a year, duration, tempo, album art, beats, bars, volume, pitch, sections, etc. The lyrics analyzer 512 may analyze text of lyrics to determine or form a semantic vector or an emotion vector. Similarly, the music analyzer 514 may analyze audio content of the song to determine or form an audio vector or an emotion vector. The server 506 may then form or retrieve a set of descriptors for the audio signal based on at least one of the semantic vector, the audio vector, and the emotion vector, and send the set of descriptors to the client device 504. The client device 504 may display the lyrics in a manner based on the set of descriptors, and optionally, in synchronization with the song being played, for example.

In one example, to determine the semantic vector, the lyrics analyzer 512 receives lyrics of a song and analyzes content of the lyrics to form the semantic vector. The lyrics analyzer 512 may use many different methods to analyze the lyrics. In one example, the lyrics analyzer 512 may identify words of the lyrics and categorize the words into a genre. Further, a structure of the lyrics may be identified using segmentation to identify stanzas (e.g., depicted by blank lines). Stanzas that are textually different, but are similar in textual structure (e.g., number of lines or syllables) may be assigned a same label. Based on genre categorization or textual structure, for example, a semantic vector may be formed. Still further, the lyrics analyzer 512 may access a database (e.g., the song database 508 or the lyrics database 510) that may include semantic metadata or semantic vectors for songs. The semantic vector may correspond to semantic content of the lyrics as a function of time with respect to a length of the audio signal. The lyrics analyzer 512 may retrieve a semantic vector corresponding to an audio signal and send the semantic vector to the client device 504.

In one example, to determine the audio vector, the music analyzer 514 receives the audio signal and processes the audio signal to determine any number of characteristics including loudness (energy) or change in loudness, frequency, speed or beat of the audio signal, etc. In addition, the music analyzer 512 may access a database (e.g., the song database 508 or the lyrics database 510) that may include acoustic data (e.g., metadata) or audio vectors for songs. The audio vector may indicate audio content of the audio elements as a function of time with respect to a length of the audio signal. The music analyzer 514 may retrieve an audio vector corresponding to an audio signal and send the audio vector to the client device 504.

In one example, to determine the emotion vector, the lyrics analyzer 512 receives lyrics of a song and processes content of the lyrics to determine the emotion vector. For example, words may be labeled into categories such as happy, sad, etc., and the categories can be used to form the emotion vector. In addition, to determine the emotion vector, the music analyzer 514 may also receive the audio signal and process the audio signal to determine factors such as the key (minor, major). Still further, the lyrics analyzer 512 and/or the music analyzer 514 may access a database (e.g., the song database 508 or the lyrics database 510) that may include acoustic data (e.g., metadata) or emotion vectors for songs. The emotion vector may indicate an emotional content of the audio elements as a function of time with respect to a length of the audio signal. Songs may be categorized into a number of clusters, and clusters may be defined by attributes including (i) passionate, rousing, confident, boisterous, rowdy, (ii) rollicking, cheerful, fun, sweet, amiable/good natured, (iii) literate, poignant, wistful, bittersweet, autumnal, brooding, (iv) humorous, silly, campy, quirky, whimsical, witty, wry, or (v) aggressive, fiery, tense/anxious, intense, volatile, visceral, for example. The emotion vector may be retrieved and sent to the client device 504.

The server 506 may send the semantic vector, the audio vector, and/or the emotion vector to the client device 504 as a set of descriptors in a single file, for example. In this manner, the server 506 may access a database (e.g., song database 508 or lyrics database 510) that stores a library of files including descriptors, and each file pertains to a song. The set of descriptors may include other information that may be used by the client device 504 to determine how to display lyrics, graphics, etc., in an animated manner along with playback of the audio signal. For example, the client device 504 can performed a weighted combination of components in the set of descriptors to determine how to display animation.

Figure 6:
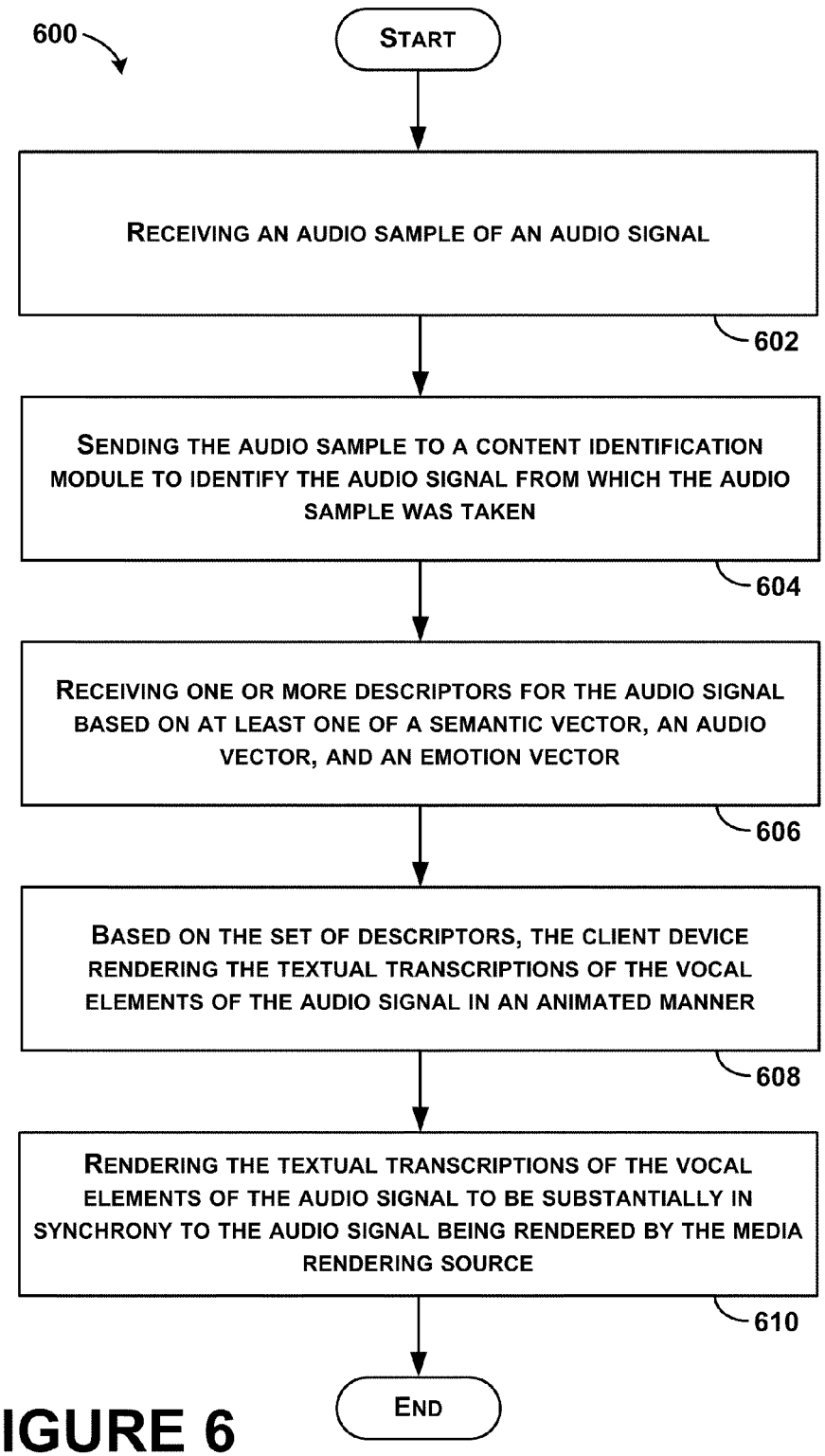
FIG. 6 shows a flowchart of an illustrative embodiment of a method for rendering a textual animation.

FIG. 6 shows a flowchart of an illustrative embodiment of a method 600 for rendering a textual animation. Initially, at block 602, an audio sample of an audio signal is received. The audio sample may include audio elements and/or vocal elements, and the audio sample may be recorded from an audio signal that is being rendered by an audio source. For example, a client device may record a portion of a song being broadcast on the radio, and the portion of the song may include audio and spoken lyrics.

At block 604, the client device may send the audio sample to a content identification module to identify the audio signal from which the audio sample was taken. For example, the client device may send the portion of the song to a server to identify the song. As an alternative, the client device may have a list of songs stored in memory or songs themselves stored in memory, and may perform a content identification of the audio sample.

At block 606, the method 600 includes receiving one or more of descriptors for the audio signal based on at least one of a semantic vector, an audio vector, and an emotion vector. The client device may receive a set of descriptors from the server in response to sending the audio sample to the server, or in response to sending a separate request to the server requesting the descriptors. The semantic vector may indicate a semantic content of corresponding textual transcriptions of the vocal elements of the audio signal as a function of time with respect to a length of the audio signal, the audio vector may indicate an audio content of audio elements of the audio signal as a function of time with respect to a length of the audio signal, and the emotion vector may indicate an emotional content of audio elements of the audio signal as a function of time with respect to a length of the audio signal. Thus, each of the set of descriptors may be defined with respect to the audio signal. The method 600 may additionally or alternatively include determining portions of the set of descriptors based on the audio sample.

The client device may receive one descriptor or one file that includes a number of vectors (e.g., semantic, audio, emotion), or may receive one vector. In addition or alternatively, the client device may receive a set of descriptors that includes a number of vectors.

The method 600 may be performed in real time or substantially in real time or offline. In real time, for example, values of the set of the descriptors may be determined (by the client device or by a server) in response to the audio sample. In offline, for example, values of the set of the descriptors may be determined based on stored recordings of audio signals, and formed to correspond to position offsets into the stored audio signal files. For example, a musical soundtrack may be processed and a log file representing an indexed annotation may be generated indicating the descriptor values at time or position points in the file. Thus, values of the set of descriptors may vary as a function of time with respect to a length of the soundtrack. As the song changes beat, tempo, etc., the set of descriptors may also change.

In addition, the client device may have sets of descriptors stored in memory, and may receive the set of descriptors by retrieving a set that corresponds to the audio sample from memory, for example. Further, the client device may store a received set of descriptors in memory to accumulate sets of descriptors for audio signals.

In one example, the client device may receive a file including the set of descriptors. The file may be an XML file, and may be tailored for a single audio signal. A database may store a library of files, and a server may retrieve a file pertaining to an identified song and send the file to the client device, for example. The file may dictate which of a number of text styles and background styles to use in an animated display on the client device. In addition, a user may also define attributes to use in the animated display. Information in the file may control aspects of visual content at a granular level to display lyrics in an animated manner.

In one example, the client device may further receive graphics, artwork, lyric text, or other images to display in the animated manner. These graphical elements may be sent to the client device with the set of descriptors, or in a separate file.

In another embodiment, an indexed annotation of descriptor values may be generated from lyric text at time or position points in the lyric text. For example, annotation may be indexed at regular time or position intervals, or at transition event points of interest in the song like semantic, emotional, or other transitional events determined from audio or text. The annotation may also be indexed at natural demarcations of the song, such as ends of lyric lines or lyric words. The file that is sent to the client device may thus also include references to times at which lyrical content should be displayed and the art style that should be applied to both text and the background so that the display is synchronized to the song. A song may have a single animation style associated with the song, or different styles may be used at different times. This enables visual changes to occur within an animation to correspond to different movements of a song.

At block 608, the method includes based on the set of descriptors, the client device rendering the textual transcriptions of the vocal elements of the audio signal in an animated manner. For example, the client device may receive lyrics corresponding to the song, and display the lyrics in an animated manner based on characteristics of the song. In addition, the client device may have lyrics stored in memory, and may retrieve the lyrics to be displayed. Still further, the client device may determine textual transcriptions of vocal elements of the audio sample using speech recognition.

The client device may render the lyrics in any animated manner. In one example, the client device may have animation themes stored in memory and may select an animation theme based on at least one of the semantic vector, the audio vector, or the emotion vector. Alternatively, the client device may receive an animation indicating how to display the lyrics. The animation themes may includes variations of colors, types of animation, backgrounds, typefaces of font, speed of animation, saturation, brightness, and background graphics. The lyrics and the background graphics may be displayed in a dynamic animation, and the animation of the lyrics may be independent of the animation of the background graphics.

At block 610, the method includes rendering the textual transcriptions of the vocal elements of the audio signal to be substantially in synchrony to the audio signal being rendered by the media rendering source. For example, the audio sample may be associated with a timestamp corresponding to a beginning time of the audio sample, and the client device may receive a time offset that indicates a time position in the audio signal corresponding to the beginning time of the audio sample and calculate a real-time offset using a real-time timestamp that indicates present time, the timestamp of the audio sample, and the time offset. The client device may further receive a numeric skew that indicates a speed at which the audio signal is being rendered by the media rendering source with reference to a given rendering speed of the audio signal, and then render the textual transcriptions of the vocal elements of the audio signal at a time corresponding to the real-time offset, at the speed indicated by the numeric skew, and to be substantially in synchrony to the audio sample being rendered by the media rendering source.

In the method 600 in FIG. 6, steps of the method 600 may be removed or not performed in some instances. For example, steps 604 and 610 to identify the audio signal and rendering the textual transcriptions in synchrony to the audio signal being rendered are optional steps. Other blocks may be removed or performed in a different order as well.

In the method 600, the client device may render the textual transcriptions of the vocal elements of the audio signal in an animated manner. Any number, type, or style of textual animations may be used, and factors that can be adjusted, for example, include font, font type, font size, font case, color, brightness, transparency, size, positioning, rotation, spacing, glow, blending movement speed, animation, background, saturation, brightness, and behavior.

Behavior and appearance of a background and texts can be set independently of one another. Example factors that can be adjusted in animation styles include rotation speed, number of layers, scale, angle, color, color gradient, texture to repeat, size of pattern, image to tile and background angle.

FIGS. 7(a)-7(i) illustrate example animations of lyrics on a client device. The animations illustrated in FIGS. 7(a)-7(i) are examples only, and any variation or other type of animation may be used as well. In addition, any combination of aspects of the illustrated animations may be used as an animation style. Furthermore, FIGS. 7(a)-7(i) illustrate animation of lyrics; however, any number or types of background animation may also be included and may be independent of animation of the lyrics as well.

Figure 7:
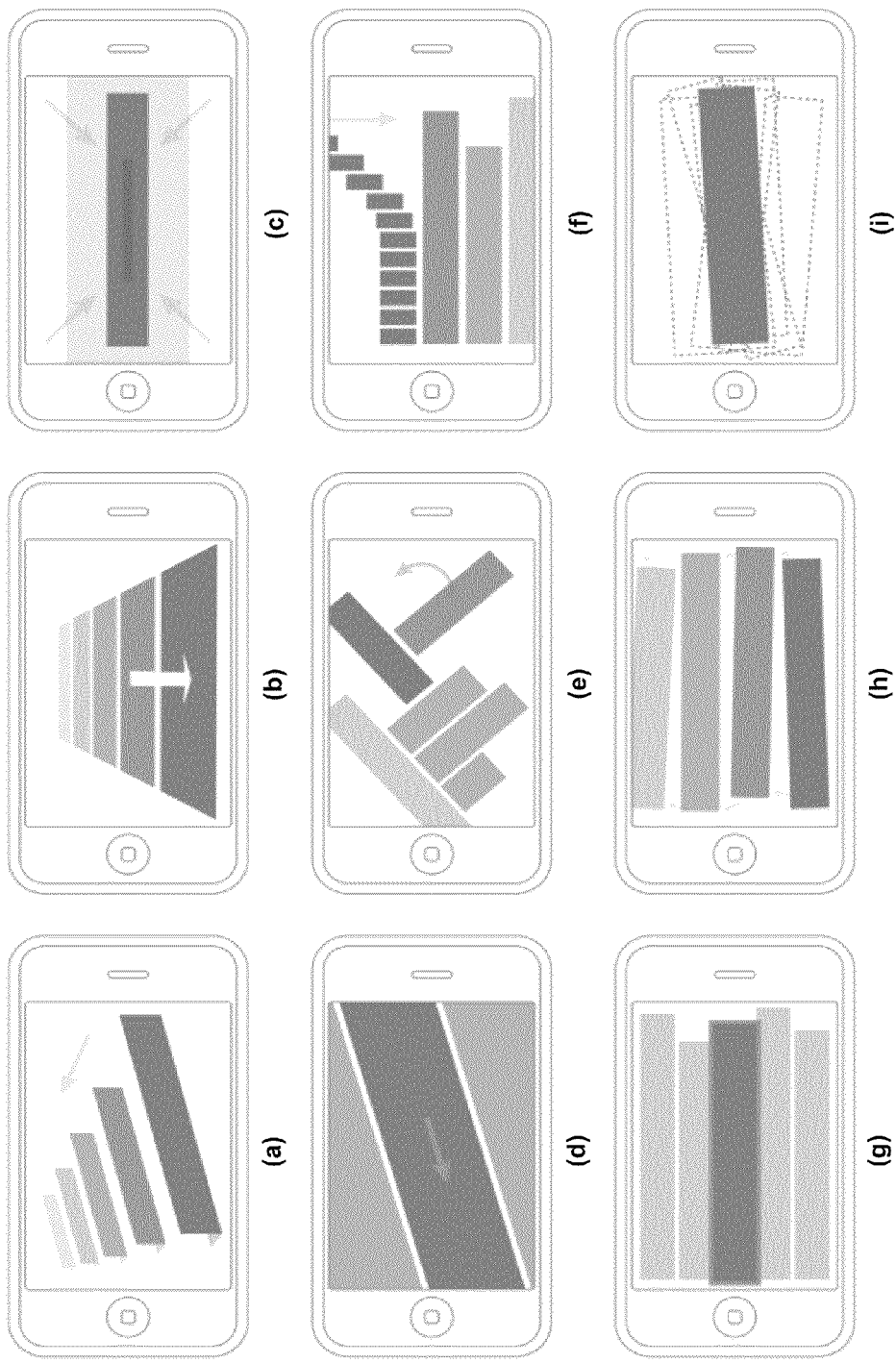
FIGS. 7(a)-7(i) illustrate example animations of lyrics on a client device.

FIG. 7(a) illustrates an example of a HITCHCOCK animation of lyrics. In this animation, upright lines of lyrics move backwards in perspective. Text can rotate in X and Y directions, and spacing between lines can be varied. Near and far distances may govern where text appears and fades. Shadow color may be used, in addition to background gradient colors and angles.

FIG. 7(b) illustrates an example of PERSPECTIVE animation of lyrics. In this animation, lines move down the screen lighting up at the bottom. A current line text color changes and upcoming lines have text color gradients. Background gradient color values and angles may also be modified.

FIG. 7(c) illustrates an example FALLING animation of lyrics. In this animation, lines of lyrics fall into the screen one at a time. Features of this animation may include barrel background rotation, a number of background layers with differences in scale and speed, background gradient color, images for repeated texture pattern, texture pattern counts vertically and horizontally, texture gradient colors, and texture brightness.

FIG. 7(d) illustrates an example SCROLL animation of lyrics. In this animation, lines of text scroll through a display screen. FIG. 7(e) illustrates an example restless animation of lyrics. In this animation, lines of lyrics bolt on or connect one at a time as text of the lyrics rotates. FIG. 7(f) illustrates an example TETRIS animation of lyrics. In this animation, lines of lyrics are formed by letters dropping in one at a time. FIG. 7(g) illustrates an example of an ILLUMINATE animation of lyrics. In this animation, several lines are shown lighting up one at a time. Color of text may be highlighted when the text is being spoken. Transition duration that controls a rate of change between concurrent lines and between a next screen of lines can be varied. FIG. 7(h) illustrates an example STACK animation of lyrics. In this animation, lines of lyrics appear at a bottom of a screen nudging other lines upward (or oppositely, lines of lyrics appear at a top of the screen nudging other lines downward). FIG. 7(i) illustrates an example of a STICKER animation of lyrics. In this animation, lines are stamped over each other at varying angles. Sticker angles and sizes can be varied, and images for sticker tiles may be provided (e.g., sticker can be formed from a tiled center with unique ends). Images may also be provided for background.

The client device may receive a file including the set of descriptors, artwork/graphics/images to display, and lyrics text and interpolate between specified animation styles in real time using time values stored within the file. The file may indicate how and when to display graphics, text, images, etc. As another example, the file may include values for the set of descriptors (e.g., categorized as high, medium, low), and the client device may access a table, such as Table 1 below, to determine how and when to display graphics, text, images, etc.

TABLE 1

| Animation Style | Semantic Vector | Audio Vector | Emotion Vector |
|---|---|---|---|
| Falling | High | Low | Medium |
| Perspective | High | Low | Medium |

TABLE 1-continued

| Animation Style | Semantic Vector | Audio Vector | Emotion Vector |
|---|---|---|---|
| Hitchcock | Medium | High | Low |
| Sticker | Medium | High | Low |
| Illuminate | Low | Medium | High |
| Stack | Low | Medium | High |

Figure 8:
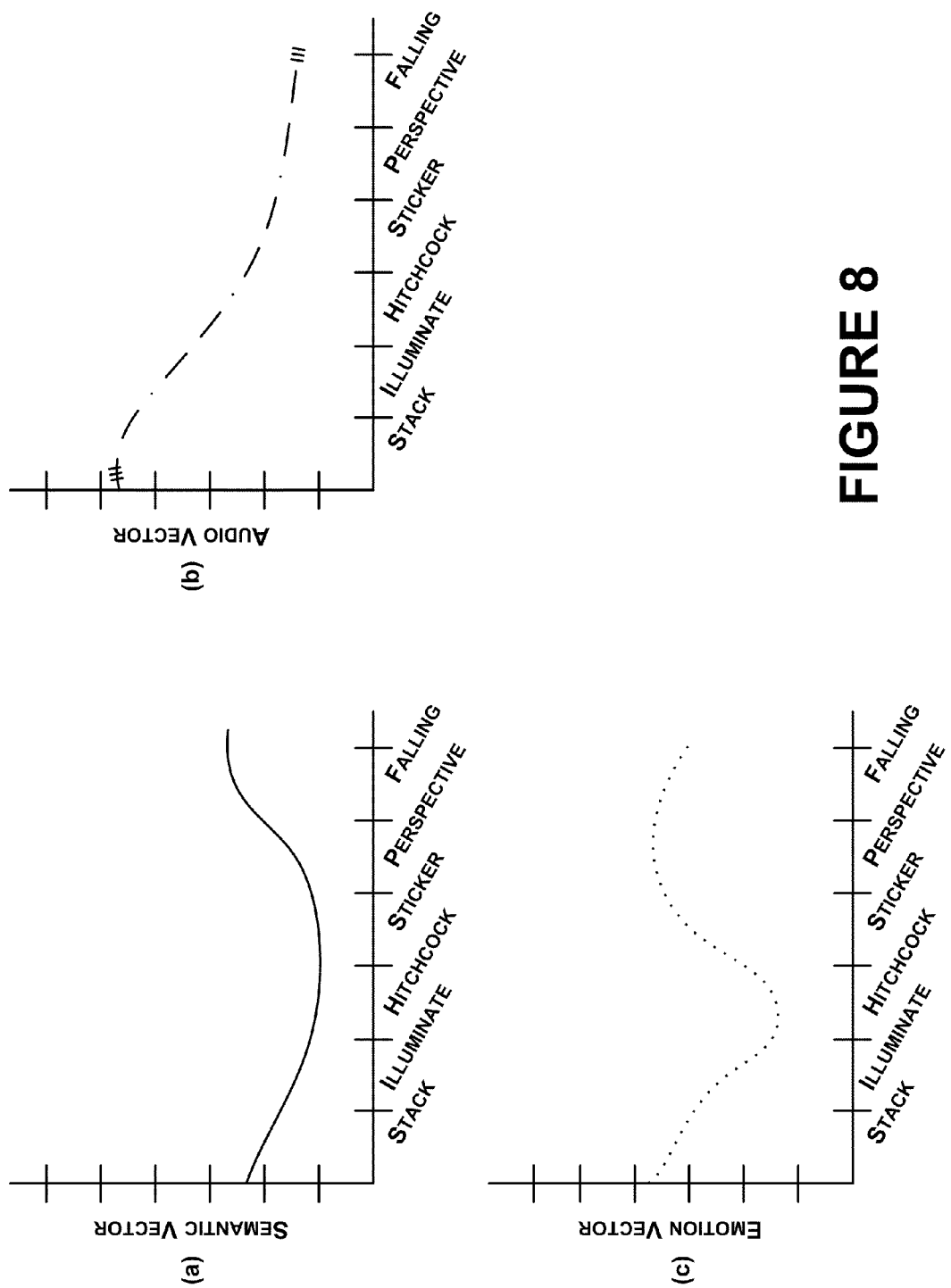
FIG. 8 illustrates example graphs of values of the semantic vector, the audio vector, and the emotion vector and corresponding animation styles to be applied.

As shown in Table 1 above, the client device may determine a vector with a highest value and use the animation style associated with that value. As another example, the client device may determine an animation style that meets or substantially meets values for all the descriptors. As still another example, FIG. 8 illustrates example graphs of values of the semantic vector, the audio vector, and the emotion vector and corresponding animation styles to be applied based on received vector values. If more than one vector is received, the client device may prioritize use of vectors in any order.

In another example, any of the descriptors may be associated with images, colors, etc., that correspond to values of the vectors. For example, lyrics may be matched with images that define or illustrate the lyrics or meaning of the lyrics, or that correspond to the title or artist of the song. The semantic vector may then include a time-annotated list of images to use that correspond to the lyrics. Similarly, the audio and emotion vector may be mapped to colors, images, graphics, animation styles that correspond to the type of song. As examples, for a fast paced song, the animation speed may also be fast-paced. For a slow paced song, the animation speed may be slow as well. For songs classified as sad, the colors and graphics may be darker colors with slow animation, and for songs classified as happy, the colors and graphics may be brighter with fast animation. For portions of songs in which the beat is up-tempo or for peak moments of songs, colors and graphics may be displayed using more intense animation, brighter colors, etc.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method of rendering a textual animation, comprising:
receiving an audio sample of an audio signal comprising at least one of audio elements and vocal elements, the audio signal being rendered by a media rendering source;
sending the audio sample to a server;
in response to sending the audio sample to the server, receiving one or more descriptors for the audio signal based on a semantic vector, an audio vector, and an emotion vector, wherein the semantic vector indicates a semantic content of corresponding textual transcriptions of vocal elements of the audio signal as a function of time with respect to a length of the audio signal, wherein the audio vector indicates an audio content of audio elements of the audio signal as a function of time with respect to a length of the audio signal, and wherein the emotion vector indicates an emotional content of audio elements of the audio signal as a function of time with respect to a length of the audio signal;
determining an animation style to be applied to the textual transcriptions per the length of the audio signal based on an ordering of values of the semantic vector, the audio vector, and the emotion vector per the length of the audio signal, wherein a respective combination of the values of the semantic vector, the audio vector, and the emotion vector corresponds to a respective animation style; and
based on the one or more descriptors, a client device rendering the textual transcriptions of vocal elements of the audio signal in a dynamic animation, wherein the dynamic animation changes over time corresponding to each of the semantic vector, the audio vector, and the emotion vector that indicate the animation style to be applied to the textual transcriptions per the length of the audio signal.

2. The method of claim 1, further comprising based on the one or more descriptors, the client device rendering the textual transcriptions of the vocal elements of the audio signal to be substantially in synchrony to the audio signal being rendered by the media rendering source.

3. The method of claim 2, wherein the audio sample is associated with a timestamp corresponding to a beginning time of the audio sample, and the method further comprises:
receiving a time offset indicating a time position in the audio signal corresponding to the beginning time of the audio sample;
determining a real-time offset using a real-time timestamp, the timestamp of the audio sample, and the time offset, wherein the real-time timestamp indicates a present time;
receiving the textual transcriptions of the vocal elements; and
the client device rendering the textual transcriptions of the vocal elements of the audio signal at a time corresponding to the real-time offset and to be substantially in synchrony to the audio sample being rendered by the media rendering source.

4. The method of claim 2, wherein the audio sample is associated with a timestamp corresponding to a beginning time of the audio sample, and the method further comprises:
receiving a time offset indicating a time position in the audio signal corresponding to the beginning time of the audio sample;
determining a real-time offset using a real-time timestamp, the timestamp of the audio sample, and the time offset, wherein the real-time timestamp indicates a present time;
receiving a numeric skew indicating a speed at which the audio signal is being rendered by the media rendering source with reference to a given rendering speed of the audio signal;
receiving the textual transcriptions of the vocal elements; and
the client device rendering the textual transcriptions of the vocal elements of the audio signal at a time corresponding to the real-time offset, at the speed indicated by the numeric skew, and to be substantially in synchrony to the audio sample being rendered by the media rendering source.

5. The method of claim 1, further comprising:
receiving an identification of a song corresponding to the audio sample; and
receiving the textual transcriptions of the vocal elements of the song.

6. The method of claim 1, further comprising receiving the one or more descriptors for the audio signal based on the identification of the song.

7. The method of claim 1, wherein receiving the one or more descriptors for the audio signal comprises the client device receiving the one or more descriptors from a server.

8. The method of claim 1, further comprising:
in response to sending the audio sample to the server:
receiving an identification of a song corresponding to the audio sample; and
receiving the one or more descriptors for the audio signal.

9. The method of claim 1, further comprising:
receiving graphics or images; and
based on the one or more descriptors, the client device rendering the graphics or images in an animated manner.

10. The method of claim 1, further comprising the client device performing the method in real time.

11. The method of claim 1, further comprising:
the client device receiving the one or more descriptors for the audio signal;
storing in memory the one or more descriptors for the audio signal;
subsequently receiving the audio sample, the audio sample being rendered by the media rendering source;
the client device retrieving the one or more descriptors for the audio signal from the memory; and
based on the one or more descriptors, the client device rendering the textual transcriptions of the vocal elements of the audio signal in the animated manner.

12. The method of claim 1, further comprising:
based on at least one of the semantic vector, the audio vector, or the emotion vector, selecting the animation style selected from the group consisting of typefaces of font, speed of animation, saturation, and brightness; and
the client device rendering the textual transcriptions of the vocal elements of the audio signal in the animated manner based on the selected animation style.

13. The method of claim 1, wherein the audio signal is a song and the textual transcriptions of the vocal elements are lyrics of the song, and the method further comprises:
receiving background graphics; and
displaying the lyrics and the background graphics in the dynamic animation based on the one or more descriptors, the animation of the lyrics being independent of the animation of the background graphics.

14. The method of claim 1, wherein the client device performs the steps of: receiving the audio sample of the audio signal and rendering the textual transcriptions of the vocal elements of the audio signal in the dynamic animation.

15. The method of claim 1, further comprising:
determining textual transcriptions of the vocal elements of the audio sample using speech recognition; and
based on the one or more descriptors, the client device rendering the textual transcriptions of the vocal elements of the audio sample in the dynamic animation.

16. The method of claim 1, wherein the one or more descriptors includes a time stamp that indicates a time position in the audio signal at which to apply specified animation.

17. A method comprising:
receiving an audio sample;
determining an identification of a song corresponding to the audio sample, the song comprising at least one of audio elements and vocal elements;
retrieving one or more descriptors for the song based on a semantic vector, an audio vector, and an emotion vector, wherein the semantic vector indicates a semantic content of corresponding textual transcriptions of the vocal elements as a function of time with respect to a length of the song, wherein the audio vector indicates an audio content of the audio elements as a function of time with respect to a length of the song, and wherein the emotion vector indicates an emotional content of the audio elements as a function of time with respect to a length of the song;
providing an animation style to be applied to the textual transcriptions per the length of the song based on an ordering of values of the semantic vector, the audio vector, and the emotion vector per the length of the song, wherein a respective combination of the values of the semantic vector, the audio vector, and the emotion vector corresponds to a respective animation style; and
sending to a client device the one or more descriptors indicating a dynamic animation to apply to the textual transcriptions per the length of the song, wherein the dynamic animation changes over time corresponding to each of the semantic vector, the audio vector, and the emotion vector that indicate the animation style to be applied to the textual transcriptions per the length of the song.

18. The method of claim 17, further comprising:
based on the one or more descriptors, selecting a textual animation or a background animation for the song; and
sending to the client device the textual animation or the background animation.

19. The method of claim 18, further comprising associating a time stamp with the textual animation or the background animation for the song, wherein the time stamp indicates a time position in the song at which to apply the textual animation or the background animation.

20. The method of claim 19, further comprising:
selecting multiple textual animations or multiple background animations for the song; and
associating a given time stamp with each textual animation or background animation for the song.

21. The method of claim 17, further comprising associating a time stamp with each descriptor in the one or more descriptors such that animation of the textual transcriptions of the vocal elements is substantially in synchrony with the audio sample when rendered.

22. The method of claim 17, further comprising determining the semantic content of corresponding textual transcriptions of the vocal elements to form the semantic vector.

23. The method of claim 1, further comprising determining musical content of the audio elements to form the audio vector.

24. The method of claim 17, further comprising determining the emotional content based on a musical key or tone of the audio elements to form the emotion vector.

25. The method of claim 17, further comprising determining the emotional content based on lyrics of the audio sample.

26. The method of claim 17, further comprising wirelessly receiving a request for the one or more descriptors from a mobile client device.

27. The method of claim 17, wherein the audio sample is associated with a timestamp corresponding to a beginning time of the song, and the method further comprises:
determining a time offset indicating a time position in the song corresponding to the beginning time of the audio sample;
sending to the client device the textual transcriptions of the vocal elements and the time offset to enable the client device to render the textual transcriptions of the vocal elements at a time corresponding to the time offset and to be substantially in synchrony to the song as being rendered by a media rendering source.

28. The method of claim 17, wherein the audio sample is associated with a timestamp corresponding to a beginning time of the song, and the method further comprises:

determining a time offset indicating a time position in the song corresponding to the beginning time of the audio sample;

determining a numeric skew indicating a speed at which the song is being rendered by a media rendering source with reference to a given rendering speed of the song; and sending to the client device the textual transcriptions of the vocal elements and the time offset to enable the client device to render the textual transcriptions of the vocal elements at a time corresponding to the time offset, at the speed indicated by the numeric skew, and to be substantially in synchrony to the song as being rendered by the media rendering source.

29. A non-transitory computer readable storage medium having stored therein instructions executable by a computing device to cause the computing device to perform functions of:

receiving an audio sample of an audio signal comprising at least one of audio elements and vocal elements, the audio signal being rendered by a media rendering source;

sending the audio sample to a server;

in response to sending the audio sample to the server, receiving one or more descriptors for the audio signal based on a semantic vector, an audio vector, and an emotion vector, wherein the semantic vector indicates a semantic content of corresponding textual transcriptions of vocal elements of the audio signal as a function of time with respect to a length of the audio signal, wherein the audio vector indicates an audio content of the audio elements of the audio signal as a function of time with respect to a length of the audio signal, and wherein the emotion vector indicates an emotional content of the audio elements of the audio signal as a function of time with respect to a length of the audio signal;

determining an animation style to be applied to the textual transcriptions per the length of the audio signal based on an ordering of values of the semantic vector, the audio vector, and the emotion vector per the length of the audio signal, wherein a respective combination of the values of the semantic vector, the audio vector, and the emotion vector corresponds to a respective animation style; and based on the one or more descriptors, rendering the textual transcriptions of vocal elements of the audio signal in a dynamic animation, wherein the dynamic animation changes over time corresponding to each of the semantic vector, the audio vector, and the emotion vector that indicate the animation style to be applied to the textual transcriptions per the length of the audio signal.

30. A method of rendering a textual animation, comprising:

receiving an audio sample of an audio signal comprising at least one of audio elements and vocal elements, the audio signal being rendered by a media rendering source;

determining an identification of a song corresponding to the audio sample and lyrics corresponding to the vocal elements;

receiving a set of descriptors for the song based on a semantic vector, an audio vector, and an emotion vector, wherein the semantic vector indicates a semantic content of the lyrics as a function of time with respect to a length of the song, wherein the audio vector indicates an audio content of audio elements of the song as a function of time with respect to a length of the song, and wherein the emotion vector indicates an emotional content of audio elements of the song as a function of time with respect to a length of the song;

determining an animation style to be applied to the textual transcriptions per the length of the audio signal based on an ordering of values of the semantic vector, the audio vector, and the emotion vector per the length of the audio signal, wherein a respective combination of the values of the semantic vector, the audio vector, and the emotion vector corresponds to a respective animation style; and receiving a time offset indicating a time position in the audio signal corresponding to a beginning time of the audio sample;

determining a real-time offset using a real-time timestamp, a beginning time of the audio sample, and the time offset, wherein the real-time timestamp indicates a present time;

based on the set of descriptors, a client device rendering the lyrics in a dynamic animation at a time corresponding to the real-time offset and substantially in synchrony to the audio signal being rendered by the media rendering source, wherein the dynamic animation changes over time corresponding to each of the semantic vector, the audio vector, and the emotion vector that indicate the animation style to be applied to the lyrics per the length of the song.

31. The method of claim 30, wherein determining the identification of the song corresponding to the audio sample comprises:

sending the audio sample to an audio identification system; and receiving information indicating the identification of the song.

32. The method of claim 30, further comprising:

receiving a numeric skew indicating a speed at which the audio signal is being rendered by the media rendering source with reference to a given rendering speed of the audio signal; and the client device rendering the lyrics at a time corresponding to the real-time offset, at the speed indicated by the numeric skew, and substantially in synchrony to the audio sample being rendered by the media rendering source.

* * * * *